(12) United States Patent
Haverinen et al.

(10) Patent No.: US 7,107,620 B2
(45) Date of Patent: Sep. 12, 2006

(54) AUTHENTICATION IN A PACKET DATA NETWORK

(75) Inventors: Henry Haverinen, Tampere (FI);
Jukka-Pekka Honkanen, Tampere (FI);
Antti Kuikka, Tampere (FI);
Nadarajah Asokan, Espoo (FI); Patrik Flykt, Helsinki (FI); Juha Ala-Laurila, Tampere (FI); Jyri Rinnemaa, Tampere (FI); Timo Takamäki, Tampere (FI); Raimo Vuonnala, Espoo (FI); Jan-Erik Ekberg, Helsinki (FI); Tommi Mikkonen, Tampere (FI); Petri Aalto, Pirkkala (FI); Seppo Honkanen, Helsinki (FI)

(73) Assignee: Nokia Corporation, Espoo (FI)

( * ) Notice: Subject to any disclaimer, the term of this patent is extended or adjusted under 35 U.S.C. 154(b) by 818 days.

(21) Appl. No.: 09/756,346

(22) Filed: Jan. 8, 2001

(65) Prior Publication Data
US 2002/0012433 A1    Jan. 31, 2002

(30) Foreign Application Priority Data
Mar. 31, 2000 (FI) .................................. 20000760

(51) Int. Cl.
G06F 7/04    (2006.01)
H04L 9/00    (2006.01)
H04M 1/66    (2006.01)
H04M 1/68    (2006.01)
H04M 3/16    (2006.01)
H04K 1/00    (2006.01)

(52) U.S. Cl. .................. 726/29; 713/168; 455/411
(58) Field of Classification Search ................ 713/153, 713/168; 709/223, 225, 229, 238; 380/270, 380/273; 455/432.1, 410, 411, 415, 428, 455/433; 726/29

See application file for complete search history.

(56) References Cited

U.S. PATENT DOCUMENTS 1,918 A * 12/1840 Hoffpauir et al. ............... 126/8
5,159,592 A * 10/1992 Perkins ........................ 370/338

(Continued)

FOREIGN PATENT DOCUMENTS

EP    1075123 A1    2/2001

(Continued)

OTHER PUBLICATIONS

Aravamudhan, Lachu et al. "NAI Resolution for Wireless Networks", Oct. 1999.*

(Continued)

*Primary Examiner*—Gregory Morse
*Assistant Examiner*—Michael J. Simitoski
(74) *Attorney, Agent, or Firm*—Perman & Green, LLP

(57) ABSTRACT

Authentication method for authenticating a mobile node to a packet data network, in which a shared secret for both the mobile node and the packet data network is arranged by using a shared secret of the mobile node and a telecommunications network authentication center. In the method, the mobile node sends its subscriber identity to the packet data network together with a replay attack protector. The packet data network obtains authentication triplets, forms a session key using them, and sends back to the mobile node challenges and a cryptographic authenticator made by using the session key. The mobile node can then form the rest of the authentication triplets using the challenges and then form the session key. With the session key, the mobile node can check the validity of the cryptographic authenticator. If the authenticator is correct, the mobile node sends a cryptographic response formed using the session key to the packet data network for authenticating itself to the packet data network.

15 Claims, 19 Drawing Sheets

U.S. PATENT DOCUMENTS

| | | | | |
|---|---|---|---|---|
| 5,519,706 | A | * | 5/1996 | Bantz et al. ............. 455/435.2 |
| 5,537,474 | A | * | 7/1996 | Brown et al. ................ 380/248 |
| 5,729,537 | A | | 3/1998 | Billstrom .................... 370/329 |
| 5,864,757 | A | | 1/1999 | Parker ........................ 455/418 |
| 6,141,544 | A | * | 10/2000 | Corriveau et al. ........... 455/411 |
| 6,445,922 | B1 | * | 9/2002 | Hiller et al. ................. 455/433 |
| 6,463,055 | B1 | * | 10/2002 | Lupien et al. .............. 370/353 |
| 6,463,154 | B1 | * | 10/2002 | Patel .......................... 380/270 |
| 6,539,237 | B1 | * | 3/2003 | Sayers et al. ............... 455/555 |
| 6,591,364 | B1 | * | 7/2003 | Patel .......................... 713/170 |
| 6,600,734 | B1 | * | 7/2003 | Gernert et al. .............. 370/352 |
| 6,654,359 | B1 | * | 11/2003 | La Porta et al. ............ 370/328 |
| 6,671,377 | B1 | * | 12/2003 | Havinis et al. ............. 380/258 |

FOREIGN PATENT DOCUMENTS

| | | |
|---|---|---|
| WO | WO 98/32301 | 7/1998 |
| WO | WO 00/02406 | 1/2000 |
| WO | WO 00/02407 | 1/2000 |
| WO | WO 01/41470 | 7/2001 |

OTHER PUBLICATIONS

Bird, Ray et al. "The KryptoKnight Family of Light-Weight Protocols for Authentication and Key Distribution", Feb. 1995, IEEE.*

Federrath, Hannes. "Protection in Mobile Communications", 1999.*

Lee, Chii-Hwa et al. "Enhanced privacy and authentication for the global system for mobile communications", 1999.*

Lee, C.-C. et al. "Extension of authentication protocol for GSM", Apr. 2003.*

Lin, Yi-Bing. "GSM Network Signaling (Tutorial Paper)", 1997.*

Menezes, Alfred J. et al. Handbook of Applied Cryptography, 1997 CRC Press, §10.3.*

Perkins, Charles E. "Mobile IP Joins Forces with AAA", Aug. 2000.*

Racal Resarch. "GSM System Security Study", Apr. 1998, <http://jya.com/gsm061088.htm>.*

Schneier, Bruce. Applied Cryptography, Second Edition, 1996 John Wiley & Sons, pp. 52-53.*

"PPP Extensible Authentication Protocol", Blunk et al., pp. 1-15, 1998.

"A Hybrid Authentication Mode for IKE", Litvin et al., pp. 1-8, 1999.

"Standards for Local and Metropolitan Area Networks: Standard for Port based Network Access Control", IEEE Draft P802.1X/D9, pp. 1-144, 2000.

"Mobile IP Challenge/Response Extensions", Perkins et al., pp. 15, 2000.

"Mobile IP Network Access Identifier Extension for IPv4", Calhoun et al., pp. 8, 2000.

"PKCS #1: RSA Encryption", Kaliski, pp. 1-19, 1998.

"Internet Security Association and Key Management Protocol", Maughan et al., pp. 1-86, 1998.

"Internet X.509 Public Key Infrastructure", Housley et al., pp. 1-129, 1999.

"IP Mobility Support", pp. 1-65, Perkins, 1996.

"Radius Accounting", Rigney, pp. 1-21, 1997.

"The Internet Key Exhange", Harkins et al., pp. 1-41, 1998.

"Remote Authentication Dial In User Service", Rigney, pp. 1-65, 1997.

"The MD5 Message-Digest Algorithm", Rivest, pp. 1-21, 1992.

"HMAC: Keyed-Hashing for Message Authentication", Krawczyk et al., pp. 1-11, 1997.

"The Network Access Identifier", Aboba et al., pp. 1-8, 1999.

"The MD5 Message—Digest Algorithm", Rivest, pp. 1-20, 1992.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |             SPI ....          |
+-+-+-+-+-+-+-+-+-+-+-+-+-+-+-+-+-+-+-+-+-+-+-+-+-+-+-+-+-+-+-+-+
| ... SPI (cont.)               |       Authenticator ....      |
+-+-+-+-+-+-+-+-+-+-+-+-+-+-+-+-+-+-+-+-+-+-+-+-+-+-+-+-+-+-+-+-+
```

Fig. 3

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |   Reserved    |  Vendor/Org-ID
+-+-+-+-+-+-+-+-+-+-+-+-+-+-+-+-+-+-+-+-+-+-+-+-+-+-+-+-+-+-+-+-+
      Vendor/Org-ID (cont)                      |  Vendor-Type
+-+-+-+-+-+-+-+-+-+-+-+-+-+-+-+-+-+-+-+-+-+-+-+-+-+-+-+-+-+-+-+-+
   Vendor-Type (cont)  |    Subtype    |          Key Lifetime
+-+-+-+-+-+-+-+-+-+-+-+-+-+-+-+-+-+-+-+-+-+-+-+-+-+-+-+-+-+-+-+-+
                      |                 MT_RAND ...
+-+-+-+-+-+-+-+-+-+-+-+-+-+-+-+-+-+-+-+-+-+-+-+-+-+-+-+-+-+-+-+-+
```

Fig. 4

| # | MT | PAC | GAGW |
|---|---|---|---|
| (1) | HDR, SA, KE [, CERTREQ] => | | |
| (2) | <= HDR, SA, KE [, CERT_GAGW] | | |
| (3) | HDR*, IDmt, Nmt => | | |
| (4) | | IMSI, MT_RAND=> | |
| (5) | | <= n*RAND, SIGNrand, MT_RAND, billingInfo | |
| (6) | <= HDR*, Npac, HASH(1), NOTIFY | | |
| (7) | HDR*, HASH(2) => | | |
| (8) | | SIGNsres, MT_RAND=> | |
| (9) | | <= SIGNresult, MT_RAND, sessiontimeout, Kpac_MT | |
| (10) | <= HDR*, <SA_b>KpacMT, HASH(3) | | |

Fig. 14

| # | MT | PAC |
|---|---|---|
| (1) | | <= HDR, SA |
| (2) | HDR, SA, KE [, CERTREQ] => | |
| (3) | | <= HDR, KE [, CERT_GAGW] |

Fig. 15

AUTHENTICATION IN A PACKET DATA NETWORK

FIELD OF THE INVENTION

This invention relates to mobile packet networks and is particularly, but not necessarily, related to authentication of a mobile node connecting to a mobile IP (Internet Protocol) network.

BACKGROUND OF THE INVENTION

In mobile IP networking, a terminal, such as a laptop computer having a Wireless Local Area Network (WLAN) adapter coupled thereto, connects to its home agent via a foreign agent. In functional terms, the terminal acts as a mobile node in the network. The terms mobile node, home agent and foreign agent are explained in publication Request For Comments 2002 as follows:

Mobile Node (MT): A host or router that changes its point of attachment from one network or sub-network to another. A mobile node may change its location without changing its IP address; it may continue to communicate with other Internet nodes at any location using its (constant) IP address, assuming that link-layer connectivity to a point of attachment is available.

Home Agent (HA): A mobile node belongs to a home network to which belongs a home agent of the mobile node. The HA is a router on a mobile node's home network which tunnels datagrams for delivery to the mobile node when it is away from home, and maintains current location information for the mobile node.

Foreign Agent: A router on a network being visited by the mobile node which provides routing services to the mobile node whilst it is registered. The foreign agent detunnels and delivers datagrams to the mobile node that were tunneled by the mobile node's home agent. For datagrams sent by a mobile node, the foreign agent may serve as a default router for mobile nodes registered with it.

Mobility Agent: Either a home agent or a foreign agent.

In the publication RFC2002, it is further explained that a mobile node is given a long-term IP address or home address in its home network. This home address is administered in the same way as a "permanent" IP address which is provided to a stationary host. When away from its home network, a "care-of address" is associated by the home agent with the mobile node and indicates the mobile node's current point of attachment. The mobile node may use its home address as the source address of IP datagrams that it sends.

It is often desirable for a mobile node to be authenticated on connection to an IP network. One way for an IP network to recognise a mobile node is by using a shared secret key known by both the IP network and the mobile node. The shared secret is to be used as the cryptographic key. The shared secret can be first known by the IP network and then be stored in a mobile node if the management of the IP network gets a secure access to the mobile node. In the interest of security, the shared secret should not be sent over a network susceptible to eavesdropping. Therefore, the mobile node should be supplied to the management of the IP network. In the future, there are likely to be many different IP networks. According to the present arrangement, a mobile node would need to be provided with a database of secret keys in order to have one for each of the different IP networks with which it could be connected.

WO00/02406 discloses an authentication method intended for a telecommunications network, especially for an IP network. From a terminal in the network a first message containing an authenticator and a data unit is transmitted to the network, the data unit containing information relating to the manner in which the authen- ticator is formed. For carrying out authentication in the network, the data unit contained in the first message is used for determining a check value, which is compared with the said authenticator. To make it unnecessary for the terminal to perform any complicated and heavy exchange of messages when attaching to the network and for still obtaining the desired security characteristics for use, such an identification unit is used in the terminal which receives as input a challenge from which a response and a key can be determined essentially in the same manner as in the subscriber identity module of a known mobile communications system, a set of authentication blocks is generated into the network, of which each contains a challenge, a response, and a key, whereby the generation is performed in the same manner as in the said mobile communication system, at least some of the challenges contained by the authentication blocks are transmitted to the terminal:

one of the challenges is chosen for use at the terminal, and, based on it, a response and a key for use are determined with the aid of the terminal's identification unit, in the said first message the network is notified with the aid of the said data unit of which key corresponding to which challenge was chosen, and the authenticator of the first message and the said check value are determined with the aid of the chosen key.

WO00/02407 concerns authentication to be performed in a telecommunications network, especially in an IP network. To allow a simple and smooth authentication of users of an IP network in a geographically large area, the IP network's terminal (TE1) uses a subscriber identity module (SIM) as used in a separate mobile communications system (MN), whereby a response may be determined from the challenge given to the identity module as input. The IP network also includes a special security server (SS), to which a message about a new user is transmitted when a subscriber attaches to the IP network. The subscriber's authentication information containing at least a challenge and a response is fetched from the said mobile communications system to the IP network and authentication is carried out based on the authentication information obtained from the mobile communications system by transmitting the said challenge through the IP network to the terminal, by generating a response from the challenge in the terminal's identity module and by comparing the response with the response received from the mobile communications system. Such a database (DB) may also be used in the system, wherein subscriber-specific authentication information is stored in advance, whereby the information in question need not be fetched from the mobile communications system when a subscriber attaches to the network.

This document discloses sending a set of challenges in case some of the challenges would conflict with reserved Security Parameter Index (SPI) values, which wastes data transmission bandwidth and is a potential security risk as it provides more data for hacking a mobile communications system's secret using which the subscriber-specific authentication information is formed.

In both WO00/02406 and WO00/02407, the terminal needs to send the response without having any assurance of the challenges being fresh and received from a bona fide network. Therefore, the terminal is not able to determine whether the challenges are part of a replay attack.

SUMMARY OF THE INVENTION

According to a first aspect of the invention there is provided an authentication method for authenticating a mobile node to a packet data network, comprising the steps of:

provinding the mobile node with a mobile node identity and a shared secret specific for the mobile node identity and usable by a telecommunications network;

providing the mobile node with a protection code;

sending the mobile node identity and the protection code from the mobile node to the packet data network;

providing the packet data network with authentication information usable by the telecommunications network, the authentication information comprising a challenge and a session secret corresponding to the mobile node identity and derivable using the challenge and the shared secret;

forming cryptographic information using at least the protection code and the session secret;

sending the challenge and the cryptographic information from the packet data network to the mobile node;

checking at the mobile node the validity of the cryptographic information using the challenge and the shared secret;

generating at the mobile node the session secret and a first response corresponding to the challenge, based on the shared secret;

sending the first response to the packet data network; and checking the first response for authenticating the mobile node.

Preferably, the method further comprises the steps of:

providing the mobile node with a subscriber identity for the telecommunications network; and forming from the subscriber identity a Network Access Identifier as the mobile node identity by the mobile node.

Preferably, the method further comprises the step of recognising the telecommunications network at the packet data network directly from the mobile node identity.

Preferably, the method further comprises the step of providing the packet data network with a shared session key based on at least one session secret.

Preferably, the method further comprises the step of providing a communications link between the packet data network and the mobile node for communicating said challenge between them, the communications link not being a link of the telecommunications network.

Preferably, the method further comprises the step of using a Subscriber Identity Module for the providing the mobile node with a mobile node identity. Preferably, the Subscriber Identity Module is used in generating of the session secret based on a shared secret specific for the mobile node identity.

Preferably, the method further comprises the steps of:

obtaining a second response by the telecommunications network; and using the second response in the checking the first response.

Preferably, the method further comprises the step of sending the challenge from the telecommunications network to the mobile node via the packet data network.

Preferably, the protection code is based on time.

Preferably, the challenge is based on RAND codes of at least two authentication triplets of the telecommunications network.

Preferably, the challenge is cryptographically formed using at least the n RAND codes.

Preferably, the method further comprises the step of providing the packet data network with a shared session key based on n session keys Kc corresponding to n RAND codes of the challenge.

Preferably, the method further comprises the step of generating an authentication key based on the shared secret, the protection code, and on an algorithm known by the mobile node and by the packet data network. In this way, it is possible to authenticate communications between the mobile node and the packet data network. The higher the number of session keys Kc is used, the stronger a shared session key K becomes.

Preferably, the packet data network is an IP network. Most preferably, the packet data network is a mobile IP network.

In an alternative embodiment, the method further comprises the step of generating a shared session key for Internet Key Exchange, wherein the shared session key is based on the at least one session secret and the at least one challenge.

In an alternative embodiment, the step of providing the mobile node with the mobile node identity and the shared secret specific to the mobile node identity further comprises the steps of:

forming a local connection between the mobile node and a mobile station, whereby the mobile station has a mobile node identity and the shared secret specific to the mobile node identity;

forming a local connection between the mobile node and a mobile station having the mobile node identity and the shared secret specific to the mobile node identity; and retrieving the mobile node identity and the shared secret from the mobile station to the mobile node.

Preferably, the step of providing the mobile node with the mobile node identity and the shared secret specific for the mobile node identity further comprises the sub-steps of:

forming a local connection between the mobile node and a subscriber identity module having the mobile node identity and the shared secret specific for the mobile node identity; and retrieving from the subscriber identity module to the mobile node the mobile node identity and a session secret specific to the mobile node identity.

According to a second aspect of the invention there is provided an authentication method in a mobile node for authenticating a mobile node to a packet data network, comprising the steps of:

providing the mobile node with a mobile node identity and a shared secret specific to the mobile node identity and usable by a telecommunications network;

providing the mobile node with a protection code;

sending the mobile node identity and the protection code to the packet data network;

receiving a challenge and cryptographic information from the packet data network;

checking the validity of the cryptographic information using the challenge and the shared secret;

generating a session secret and a first response corresponding to the challenge, based on the shared secret; and sending the first response to the packet data network.

According to a third aspect of the invention there is provided an authentication method in a packet data network for authenticating a mobile node to the packet data network, comprising the steps of:
- receiving a mobile node identity and a protection code from a mobile node, the mobile node identity corresponding to a shared secret;
- obtaining authentication information usable by the telecommunications network, the authentication information comprising a challenge and a session secret corresponding to the mobile node identity and derivable using the challenge and the shared secret;
- forming cryptographic information using at least the protection code and the session secret;
- sending the challenge and the cryptographic information to the mobile node;
- receiving a first response from the mobile node; and
- verifying the first response using the session secret.

According to a fourth aspect, there is provided a method for communicating between a packet data network and a mobile node having an access to a subscriber identity of a mobile telecommunication network, comprising the steps of:
- providing a mobile node with a subscriber identity for the telecommunications network; and
- forming, by the mobile node, of the subscriber identity a Network Access Identifier as a mobile node identity for use by the packet data network.

According to a fifth aspect, there is provided an authentication method in a gateway for acting as an interface between a packet data network and a telecommunications network having an access to an authentication server, comprising the steps of:
- receiving a Network Access Identifier from the packet data network;
- forming a subscriber identity suitable for use in a telecommunications network from the Network Access Identifier;
- providing the telecommunications network with the subscriber identity;
- receiving from an authentication server a challenge and a session secret that corresponds to the challenge and to the subscriber identity; and
- providing the packet data network with the challenge.

According to a sixth aspect, there is provided a Gateway for acting as an interface between interfacing a packet data network and a telecommunications network having an access to an authentication server, the gateway comprising:
- an input for receiving a mobile node identity and a protection code from the packet data network;
- an output for providing the authentication server with the mobile node identity;
- an input for receiving a challenge and a session secret corresponding to the mobile node identity from the authentication server;
- a first processor for forming cryptographic information using at least the protection code and the session secret;
- an output for providing the packet data network with the challenge and the cryptographic information for further transmission to a mobile node;
- an input for receiving a first response corresponding to the challenge, based on a shared secret specific to the subscriber identity and known by the mobile node and the telecommunications network, from the mobile node via the packet data network; and
- a second processor for verifying the first response for authenticating the mobile node.

According to a seventh aspect, there is provided a gateway for acting as an interface between a packet data network and a telecommunications network having an access to an authentication server, the gateway comprising:
- a first input for receiving a Network Access Identifier from the packet data network;
- a processor for forming a subscriber identity suitable for use in a telecommunications network from the Network Access Identifier;
- a first output for providing the telecommunications network with the subscriber identity;
- a first input for receiving from an authentication server a challenge and a session secret corresponding to the challenge and to the subscriber identity; and
- a second output for providing the packet data network with the challenge.

According to an eighth aspect, there is provided a communication system comprising:
- a telecommunications network;
- a packet data network;
- a mobile node;
- the mobile node comprising a first processor for forming a protection code;
- a gateway for acting as an interface between the packet data network with the telecommunications network;
- a subscriber identity module accessible by the mobile node comprising a subscriber identity and a shared secret;
- an authentication server for the telecommunications network comprising the shared secret mapped to the subscriber identity;
- the authentication server being adapted to receive the subscriber identity and responsively to return a challenge;
- the gateway comprising a second processor for forming cryptographic information based on the protection code;
- the mobile node being adapted to receive from the gateway the challenge and the cryptographic information; and being adapted to provide the subscriber identity module with the challenge to responsively to receive a first response based on the challenge and the shared secret;
- the first processor being further adapted to verify the protection code to authenticate the gateway to the mobile node; and
- a third processor accessible by the gateway for verifying the first response in order to authenticate the mobile node.

According to a ninth aspect, there is provided a communication system comprising:
- a telecommunications network;
- a packet data network;
- a mobile node having a mobile node identity;
- a gateway for acting as an interface between the packet data network with the telecommunications network;
- a subscriber identity module accessible by the mobile node comprising a subscriber identity and a shared secret;
- an authentication server for the telecommunications network comprising the shared secret mapped to the subscriber identity;
- a first processor accessible by the gateway for forming the subscriber identity of the mobile node identity for the telecommunications network;

the authentication server being adapted to receive the subscriber identity and responsively to return a challenge;

the subscriber identity module being adapted to receive the challenge and responsively to form a first response based on the challenge and the shared secret; and a second processor accessible by the gateway for verifying the first response in order to authenticate the mobile node.

According to a tenth aspect, there is provided a mobile node comprising:

a subscriber identity module having a subscriber identity for identifying the subscriber to a telecommunication network and a shared secret specific to the subscriber identity module and known by an authentication server accessible by the telecommunication network;

a processor for forming a mobile node identity based on the subscriber identity; and a communication block for communicating with a packet data network, adapted to send the mobile node identity to the packet data network and to receive responsively a challenge from the packet data network;

wherein the subscriber identity module is adapted to form a first response corresponding to the challenge, based on the shared secret.

According to an eleventh aspect, there is provided a computer program product for controlling a mobile node for authenticating the mobile node to a packet data network, comprising:

computer executable code to enable the mobile node to obtain a mobile node identity and a shared secret specific to the mobile node identity and usable by a telecommunications network;

computer executable code to enable the mobile node to obtain a protection code;

computer executable code to enable the mobile node to send the mobile node identity and the protection code to the packet data network;

computer executable code to enable the mobile node to receive a challenge and cryptographic information from the packet data network;

computer executable code to enable the mobile node to check the validity of the cryptographic information using the challenge and the shared secret;

computer executable code to enable the mobile node to generate a session secret and a first response corresponding to the challenge, based on the shared secret; and computer executable code to enable the mobile node to send the first response to the packet data network.

According to a twelfth aspect, there is provided a computer program product for controlling a packet data network to authenticate a mobile node to the packet data network, comprising:

computer executable code to enable the packet data network to receive a mobile node identity and a protection code from a mobile node, the mobile node identity corresponding to a shared secret;

computer executable code to enable the packet data network to obtain authentication information usable by the telecommunications network, the authentication information comprising a challenge and a session secret corresponding to the mobile node identity and derivable using the challenge and the shared secret;

computer executable code to enable the packet data network to form cryptographic information using at least the protection code and the session secret;

computer executable code to enable the packet data network to send the challenge and the cryptographic information to the mobile node;

computer executable code to enable the packet data network to receive a first response from the mobile node; and computer executable code to enable the packet data network to verify the first response using the session secret.

According to a thirteenth aspect, there is provided a computer program product for controlling a mobile node to communicate with a packet data network, the mobile node having an access to a subscriber identity usable by a telecommunications network, the computer program product comprising:

computer executable code to enable the mobile node to provide a mobile node with the subscriber identity; and computer executable code to enable the mobile node to form a Network Access Identifier of the subscriber identity as a mobile node identity for use by the packet data network.

According to a fourteenth aspect, there is provided a computer program product for controlling a gateway for acting as an interface between a packet data network and a telecommunications network having an access to an authentication server, the computer program product comprising:

computer executable code to enable the gateway to receive a Network Access Identifier from the packet data network;

computer executable code to enable the gateway to form of the Network Access Identifier a subscriber identity suitable for use in a telecommunications network;

computer executable code to enable the gateway to provide the telecommunications network with the subscriber identity;

computer executable code to enable the gateway to receive from an authentication server a challenge and a session secret corresponding to the challenge and to the subscriber identity; and computer executable code to enable the gateway to provide the packet data network with the challenge.

According to a fifteenth aspect there is provided a memory medium containing a computer program product according to any of the previous aspects.

In an alternative embodiment, the method comprises the step of authenticating the mobile node to the packet data network with a preliminary authentication method before authenticating the mobile node to the packet data network.

Advantageously, by utilising the secret shared between the telecommunications network and the mobile node, subscriber identity modules can be used for strong mutual authentication. This provides a straightforward trustworthy authentication procedure in which existing authentication data of the telecommunications network can be used.

The embodiments of one aspect also apply to various other aspects of the invention. In sake of briefness, the embodiments have not been repeated in connection with every aspect of the invention. A skilled reader will appreciate the advantages of the various aspects based on the advantages of the first aspect of the invention.

BRIEF DESCRIPTION OF THE DRAWINGS

The invention will now be described, by way of example only, with reference to the accompanying drawings, in which:

FIG. 3 shows an authentication extension according of the system of FIG. 1;

FIG. 4 shows the format of a new shared session key request extension of the system of FIG. 1;

FIG. 14 shows an Internet Key Exchange procedure when a mobile node is an initiator of Internet Key Exchange negotiation according to yet another embodiment of the invention;

FIG. 15 shows modifications to the procedure of FIG. 14 when the Public Access Controller instead of the mobile node is an initiator of Internet Key Exchange negotiation.

DETAILED DESCRIPTION

Figure 1:
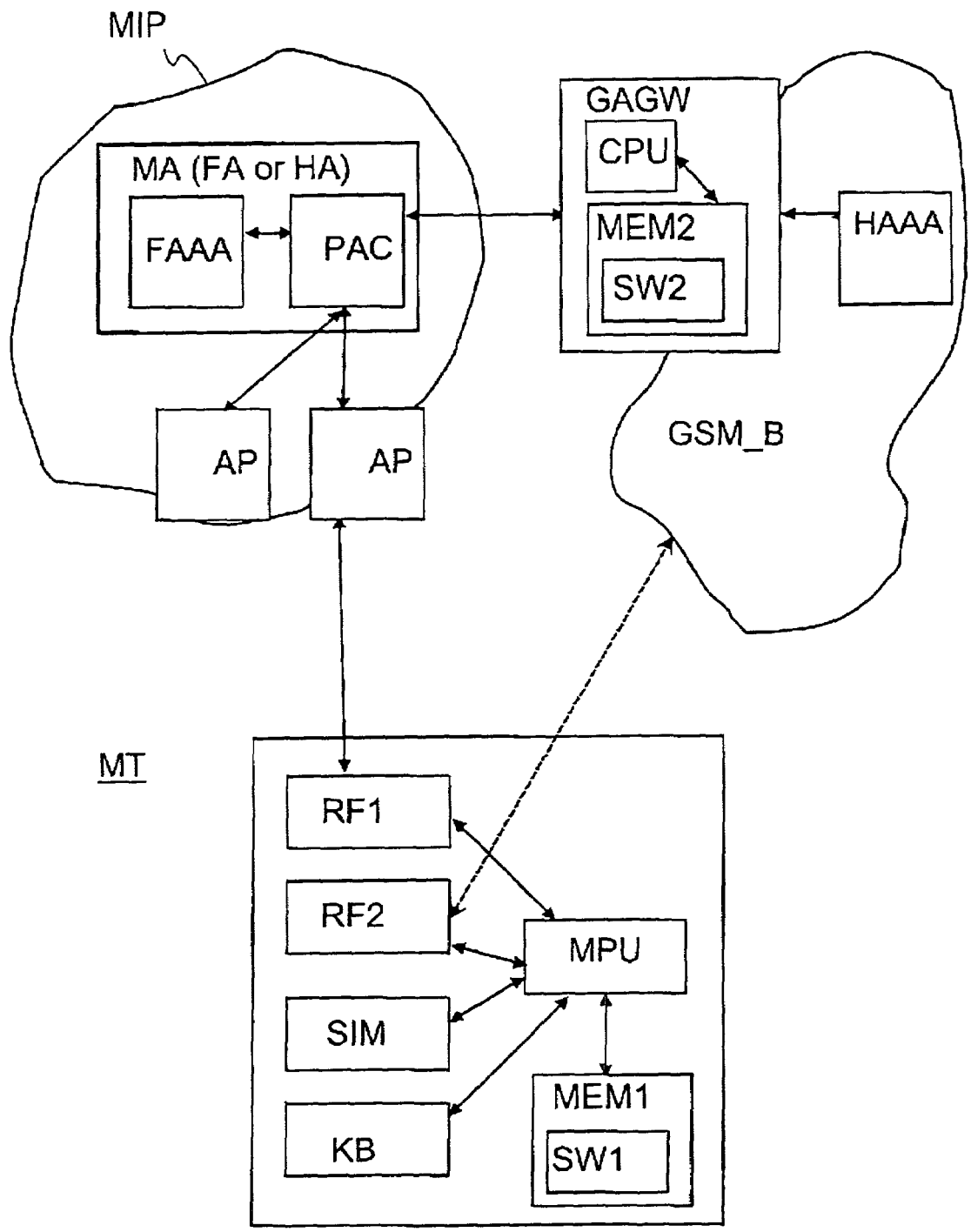
FIG. 1 shows a system comprising an IP network having an IP networking compliant mobile station according to a preferred embodiment of the invention.

In the following, a preferred embodiment of the invention will be described applied to a Global System for Mobile Communications (GSM) telecommunications network. For authenticating a mobile node to a packet data network, Subscriber Identity Module (SIM) cards normally used for authenticating GSM subscribers GSM networks are utilised. During authentication process, the SIM and the GSM telecommunications network communicate across the packet data network rather than the GSM telecommunications network.

The actual type of the telecommunications network is irrelevant. GSM is used as an example, but the network type could as well be Universal Mobile Telecommunications System (UMTS) or GSM with General Packet Radio Service (GPRS). Actually, GPRS can be understood as an extension to GSM rather than an independent network in the sense that GPRS operates using GSM radio access network and GSM authentication methods.

The invention will be described using three examples. Example 1 relates to a mobile IP implementation, where existing mobile IP extensions are utilised. Example 2 relates to a wireless LAN environment with roaming from one sub-network to another sub-network. Example 3 relates to generation of IKE keys for Internet nodes.

EXAMPLE 1

Mobile IP

In the preferred embodiment of the invention, mobile nodes are identified by an International Mobile Subscriber Identity (IMSI) in the form of a string of digits. The IMSI is by definition a unique subscription identifier consisting of a national mobile subscriber identity and a mobile country code. For example, in the GSM, the IMSI is represented by bytes fewer than the number of digits in the IMSI.

The IMSI is transmitted in mobile IP messages as a Network Access Identifier (NAI). The NAI is in form of imsi@sonera.fi (for example "1234567@sonera.fi") or imsi@gsm.org (for example "1234567@gsm.org"). Hence, the NAI carries an identity (for example as text or as an identifier number) of the mobile telecommunications network whose subscriber the mobile node is and an identification of the domain of the mobile node. This allows recognising the telecommunications network directly from the NAI.

The latter of those two examples of NAI, the gsm.org domain, is an example on an upper level domain that is adapted to seek for the appropriate domain relating to the relevant GSM telecommunications network operator.

The forming of the NAI from the IMSI allows later determination by the packet data network of the relevant GSM telecommunications network operator, based on the NAI alone. This removes need to maintain at the packet data network any local database mapping together different telecommunications network operators and their subscribers.

In general, identifying mobile nodes with NAIs is known to a person ordinarily skilled in mobile IP. An NAI extension can be included in a Registration Request or a Registration Reply, both of which are described later.

Operation of the SIM card in the GSM telecommunications network will now be explained. In GSM, there are known authentication algorithms which are referred to as A3 and A8. These algorithms run on the SIM and in the GSM telecommunications network. These algorithms and a GSM shared secret $K_i$ are known by the SIM and the GSM telecommunications network operator, which typically stores them in an HLR (Home Location Register) of a Mobile services Switching Centre (MSC).

In authentication, the GSM telecommunications network operator generates a challenge RAND that is a 128 bit random code, which is to be used as a challenge, a corresponding 64 bit GSM session key Kc and a 32 bit signed response SRES for verifying the response to the challenge. The 64 bit session GSM session key Kc is generated by the A8 algorithm as $A8(K_i, RAND)$ and the 32 bit long SRES is generated by the $A3(K_i, RAND)$. The combination RAND, SRES and Kc is generally referred to as a GSM triplet. The GSM telecommunications network operator sends the RAND to its subscriber (GSM telephone), the RAND is received by the subscriber and the subscriber passes it to the SIM, which reproduces SRES and Kc. Then the SIM responds to the challenge by sending the SRES. The operator receives the SRES and can confirm the identity of the SIM. The GSM telecommunications network operator can also verify that it shares a Kc with the SIM. Then the Kc can then be used to encrypt data traffic over a GSM radio channel. The advantage of this challenge-response mechanism is that Kc never need be sent over the GSM radio channel and thus it cannot be eavesdropped.

FIG. 1 shows a communication system 10 comprising a mobile IP network MIP having an IP networking compliant mobile node MT according to a preferred embodiment of the invention. The mobile node MT is typically a laptop computer with a wireless network adapter and software for networking. A plurality of mobile nodes MT can be attached to the MIP. The mobile node MT comprises a keyboard KB, a Subscriber Identity Module SIM_B, a first radio block RF1 (A PCMCIA) Wireless LAN adapter) for communicating with a radio access point over a WLAN radio channel, (optionally) a second radio block RF2 (A PCMCIA GSM adapter) for communicating with a GSM network GSM_B, a master processing unit MPU (for example a microprocessor or digital signal processor) for controlling the aforementioned blocks and a memory MEM1 containing a first software SW1 for operating the MPU. In one embodiment, referring to FIG. 1 the communication link between the packet data network and the mobile node, for example between the AP and RF1, is not a link of the telecommunications network.

The MIP comprises a plurality of Access Points AP for providing the MT with a wireless connection, a Public Access Controller PAC for controlling the APs and a Foreign Authentication, Authorisation and Accounting server FAAA.

The GSM network GSM_B is a home GSM network of the SIM_B. The GSM_B comprises a Home Authentication, Authorisation and Accounting server HAAA, which has a subscriber data database comprising accounting and authorisation data the subscribers of the GSM_B. These data include the IMSI and GSM shared secret $K_i$ for each subscriber.

The MIP is connected to the GSM_B by a GSM Authentication Gateway GAGW. The GAGW is a server and it has a memory MEM2 for storing a second software SW2 and a central processor CPU for controlling the operation of the server by executing the second software SW2. The GAGW couples together a server in the GSM_B and a server in the MIP. These servers are designated as a home AAA server HAAA (AAA refers to Authentication, Authorisation and Accounting) and as a foreign AAA server FAAA. The PAC can also function as a mobility agent MA. If the MIP is the home network of the MT, then the PAC is also a Home Agent HA of the MT. Otherwise the PAC belongs to a foreign network and the PAC can be referred to as a Foreign Agent FA. HAAA is located in the GSM_B and FAAA is located in the MIP. Communication between the two AAA servers occurs by means of a suitable AAA protocol. The AAA protocol is not described here.

An overview of the authentication process will now be briefly described. In order to authenticate a mobile node for a packet data network, a shared session key K is generated both in the MT and in the FAAA server. Authentication is carried out using GSM_B and its SIM, SIM_B. In this case the authentication procedure will be similar to that described above in relation to a basic GSM network. Authentication utilises the $K_i$ which is present on the SIM_B and in the GSM_B.

The SIM_B is accessed by providing the MT (for example a laptop computer with a wireless local area network adapter) with a SIM card reader. Alternatively, the MIP does not directly access the $K_i$ of the GSM_B, but receives a RAND relating to the SIM_B. This RAND is sent to the MT and the RESP is verified against the RESP that the telecommunications network has produced. Authentication can be further improved by using multiple RANDs in order to generate an authentication key which is more secure than just one Kc.

Figure 2:
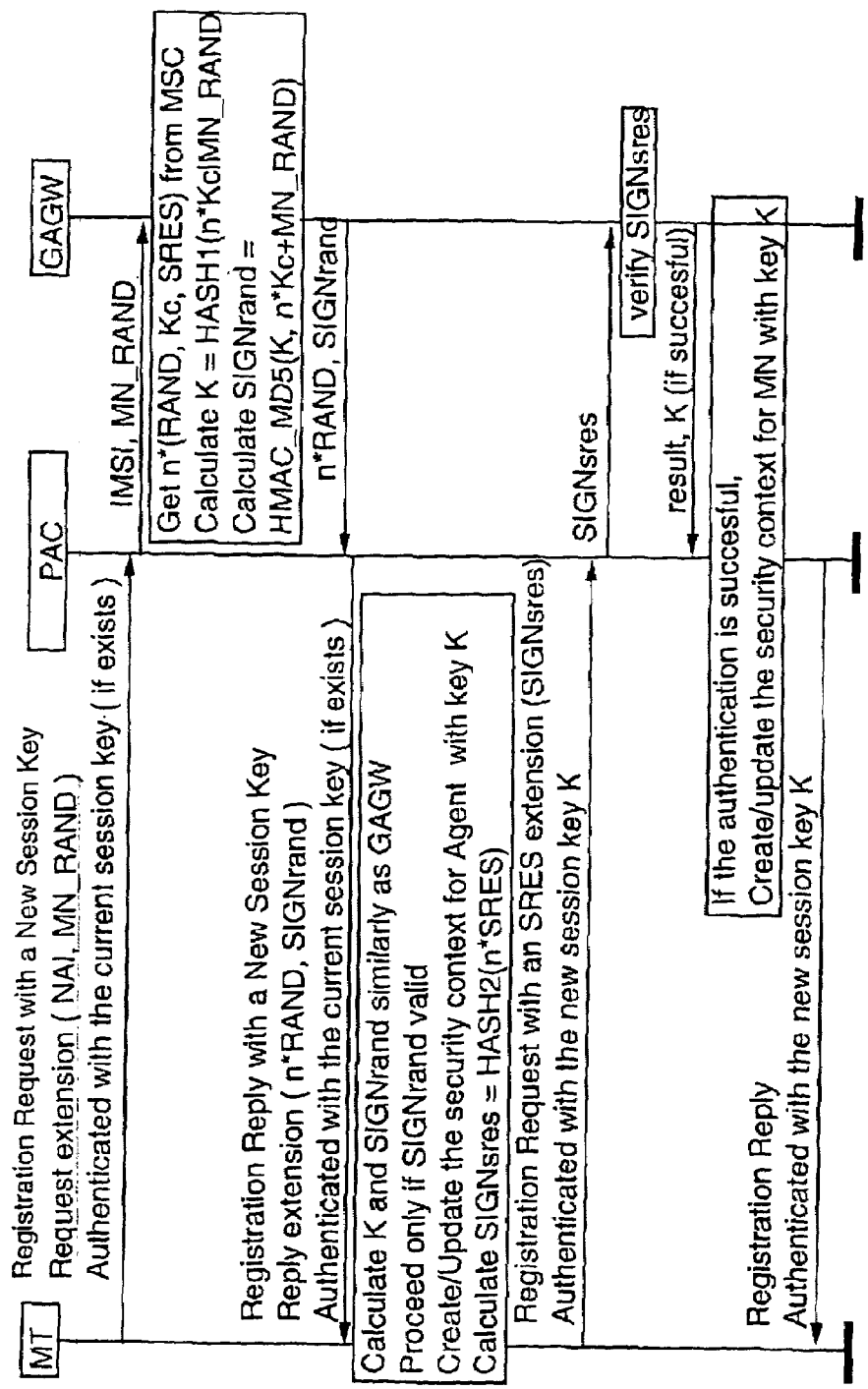
FIG. 2 shows a shared session key exchange procedure of the system of FIG. 1.

FIG. 2 shows a shared session key exchange procedure of the system of FIG. 1. In the following, the procedure is briefly summarised and then described in more detail.

1. The MT sends to the FAAA a Network Access Identifier NAI and a protection code MT_RAND (also known in Mobile IP terminology as nonce) generated by the MT. The MT_RAND remains the same during an authentication session and it is meant to hinder replay attacks. The MT_RAND is typically a random number or based on time (a timestamp with certain resolution).
2. The FAAA sends to the HAAA an initial identification message containing the IMSI or NAI of the MT, and the MT_RAND.
3. The HAAA retrieves n GSM triplets, each comprising a RAND, a Kc, and a SRES. Then, the HAAA computes the K=H(n*Kc,MT_RAND) for the MT. Here n is an integer greater than or equal to 1, * represents the number of parameters (n*Kc refers to n different Kcs) and H ( ) represents a one-way hash function. The HAAA also computes a value SIGNrand which is calculated from MAC(K,n*RAND,MT_RAND), where MAC denotes a message authentication code. SIGNrand is a cryptographic checksum to verify that the n RANDs really originate from an entity that has access to the $K_i$ (as K is derived from that). The checksum also indicates if the n RANDs indeed are generated during the same authentication session because the MT_RAND changes from one authentication session to another.
4. The HAAA sends the n RANDs, the SIGNrand and optionally the IMSI to the FAAA. The IMSI itself need not be used if another session identifier has been sent with the IMSI in step 1 of this procedure. In this case, this session identifier would be used instead of the IMSI.
5. The FAAA sends at least one RAND and SIGNrand to the MT.
6. Using the $_i$ stored on the SIM_B, the MT calculates the K. Using the K, the n RANDs and the MT_RAND, the MT then tests SIGNrand. If SIGNrand is correct, the MT generates a copies of the n SRESs (one for each RAND). The MT computes a cryptographic checksum SIGNsres=HASH2(K,n*SRES) for the K and the SRESs.
7. The MT sends the SIGNsres to the FAAA. In the MT, the calculation of the K is the same as the calculation of the K in the HAAA.
8. The FAAA sends the SIGNsres to the HAAA.
9. The HAAA verifies that SIGNsres is valid by checking that the equation SIGNsres=HASH2(K,n*SRES) applies with the values the MT has received. The HAAA sends the result (whether the SIGNsres is valid) to the FAAA. If the SIGNsres is valid, the HAAA sends also the K to the FAAA.
10. Authentication is complete and the FAAA and the MT share the K.

The FAAA is functionally connected to several HAAAs and the FAAA selects the correct HAAA based on the domain part of the user's NAI, for example "sonera.fi". The HAAA uses a HAAA-HAAA protocol to send the initial identification message to the correct HAAA or to GSM infrastructure such as a Mobile Switching Centre (MSC). According to an alternative embodiment, the FAAA is configured to communicate with a single HAAA and always sends the message in step 1 to that HAAA.

The procedure of FIG. 2 will now be described. It starts by a message Registration Request that contains a New Session Key Request extension. This and the following extensions are explained later, referring to FIGS. 3 to 6. The IMSI can be transmitted in a Network Access Identifier (NAI) extension. The New Session Key Request extension contains a maximum key lifetime and a random number MT_RAND picked by the MT. When the MA receives the Registration Request with the New Session Key Request extension, it sends the NAI (containing the IMSI) and MT_RAND to the HAAA. If the MA is a home agent operated by a GSM telecommunications network operator, the home agent typically has a direct access to GSM triplets. In an embodiment of the invention, a number of triplets are retrieved in advance in order to speed up the registration. Once the HAAA has obtained n GSM triplets for the MT by whatever means, it calculates the new K and an authenticator SIGNrand, as described above.

The MA then sends a Registration Reply with a New Session Key Reply extension to the MT. The Registration Reply contains the MT_RAND and the SIGNrand, so that the MT is able to verify that the RANDs are current and that they were generated by the GSM infrastructure. The Registration Reply also contains the remaining key lifetime, which can be equal to, or smaller than, the key lifetime proposed by the MT.

If the MT and the MA do not share a security context, the authentication of the first Registration Request and the Registration Reply will fail. The reply code in the Registration Reply is "mobile node failed authentication" or "identification mismatch". In mobile IP, an authentication extension is used. The authentication extension has a special value for a security parameter index (SPI) field, meaning "New Session Key Exchange". The SPI and the IP address of the MT are used as an index for managing authentication procedures regarding different mobile nodes. The authentication extension has also a field for an authenticator, that is typically a MAC code. The authenticator can be empty. Thus, if the MA does not support authentication according to the present invention, it will simply reply with the reply code "Mobile node failed authentication". If the MA is a foreign agent, the MT should omit the authentication extension altogether.

After receiving the Registration Reply with the New Session Key Reply extension, the MT is able to verify the validity of the SIGNrand. If the SIGNrand is valid, the MT generates the key K and the SIGNsres and creates a new security context for the MA or, if such already exists, updates the context with the new K. This key will used as the Mobile IP authentication key in subsequent registration messages.

The MT includes the SIGNsres in an SRES extension in the next registration request it sends to the MA. The MA sends the SIGNsres to the HAAA, which verifies it and sends an indication to the MA. If the SIGNsres is valid, the HAAA also sends the K to the MA. Now the MA can create/update the security context for the MT.

If the MA is the FA, the K could now be distributed to all the foreign agents in the visited domain.

Since the MA may need to get the SRES extension quickly, it is advantageous that the MT sends the Registration Request with the SRES extension immediately after reception of the RAND.

The security context created by the K exchange mechanism described above has an SPI. Here, another well-known SPI is used for the SIM-generated security context. A value is reserved for the SPI "SIM-generated security context" and for the SPI "new session key exchange".

According to the preferred embodiment, the default algorithm in Mobile IP authentication is keyed MD5 in prefix+suffix mode. In this mode, an authentication digest for a message is calculated by running MD5 over the following stream of bytes: a first occurrence of the K and the protected fields from the Registration Request and a second occurrence the K.

The authentication digest is transmitted in an authentication extension as shown in FIG. 3. FIG. 3 shows an exemplary bit map as a table of bits, wherein each row has four octets. There are three kinds of authentication extensions: a mandatory Mobile-Home authentication extension used between the MT and the home agent, an optional Mobile-Foreign authentication extension used between the MT and the foreign agent and an optional Foreign-Home authentication extension used between the FA and the HA. All these extensions have the same format. SPI is an opaque identifier. An authenticator (that verifies the recipient of the message) of the authentication extension maps the SPI and the peer's IP address to a security context in the mobility security association database. The security context contains a key, the algorithm and other security parameters. The authenticator field contains the message digest.

In Mobile IP authentication according to the preferred embodiment, the security contexts (including the K) are generated by using the SIM_B. Because the RANDs are generated by the GSM_B, for example by the HAAA, the MT needs first to send its IMSI to the MA with which it is registering. Then the MA is able to use the FAAA-HAAA protocol in order to obtain GSM authentication information for the MT (as described above) and use this information for generating the K, with the MT. After the K has been generated, the MT is able to register with/through the MA. The K can be used for several subsequent registrations. However, there is a lifetime for this K and before the lifetime expires, a new K can be generated by a similar procedure.

The K exchange messages between the MT and the MA are transmitted as extensions to the Registration Request and Registration Reply. Three new extensions to registration messages between the MT and the MA are needed in order to agree upon the K. These extensions are a New Session Key Request extension, a New Session Key Reply extension and an SRES extension.

Typically, the MT knows that its HA supports the authentication according to the present invention. However, the MT may not know which authentication method or methods the FA supports. To test whether the FA supports the authentication method according to the invention, the MT includes the New Session Key Request extension for the foreign agent in the first Registration Reply and omits the Mobile-Foreign authentication extension. The New Session Key Request extension is optional. If the FA does not support it, the FA should ignore it and remove it before forwarding the request to the HA. When the MT receives the Registration Reply, it implements the following logic:

If the Registration Reply contains a New Session Key Reply extension and the reply code from the FA is the error code "mobile node failed authentication", the FA supports authentication according to the present invention. If the New Session Key Reply is valid, the MT creates a security context for the FA and includes an SRES extension for the FA in the next Registration Request.

If the FA did not set the reply code to an error code and the Registration Reply does not contain a New Session Key Reply extension and the reply code from the FA is not set, the FA does not support the authentication but alternatively allows registrations without Mobile-Foreign authentication. The MT can carry out subsequent registrations with the FA without any authentication extensions being required.

If the Registration Reply does not contain a New Session Key Reply extension and the reply code from the foreign agent is the error code "mobile node failed authentication", the FA does not support authentication according to the present invention and so requires a different kind of authentication. In this case, if the MT has only the authentication functionality according to the present invention, it cannot register with the FA.

When the FAAA receives a Registration Request from a mobile node with which the FA does not share a security context, the FA has the following options:

If there is an invalid Mobile-Foreign authentication extension in the Registration Request, the FA replies with the error code "mobile node failed authentication".

This is the standard Mobile IP behaviour.

If the Registration Request does not contain a Mobile-Foreign authentication extension and if the local policy does not require Mobile-Foreign authentication, the FA forwards the Registration Request to the HA. The FA does not include a New Session Key Reply extension in the Registration Reply even if there was a New Session Key Request extension in the Registration Request. This is the standard Mobile IP behaviour. This configuration could be useful, for example, in corporate access zones.

If the local policy in the FA requires Mobile-Foreign authentication, and there is no Mobile-Foreign Authentication extension nor New Session Key Request extension in the Registration Request, the FA replies with the error code "mobile node failed authentication". This is the standard Mobile IP behaviour.

If the local policy in the FA requires Mobile-Foreign authentication, and the Registration Request contains a New Session Key Request extension and no Mobile-Foreign Authentication extension, then the FA does not forward the Registration Request to the home agent but instead replies with the error code "mobile node failed authentication" and includes a New Session Key Reply extension in the Registration Reply. If the MT then sends another Registration Request with a valid SRES extension and a valid Mobile-Foreign Authentication extension, the FA forwards the request to the HA.

Only certain GSM subscribers are authorised to register through a particular MA. User authorisation may be done in any of the following entities:

the GSM infrastructure. The GSM telecommunications network (MSC/HLR) may support authentication according to the present invention for certain subscribers only.

the HAAA. The HAAA may be configured with a list of authorised IMSIs. The HAAA may have a separate list for each access controller with which it is connected. This allows the HAAA to decide which subscribers are authorised users of a certain MA. If the HA is operated by the GSM telecommunications network operator, the HAAA may conveniently store this kind of authorisation information.

the FAAA. If a corporation operates the FAAA, for example for its employees, the corporation might want to control which GSM subscribers are allowed to register with the FAAA. In this case, the MA needs to maintain a list of authorised GSM subscribers. The MA also needs to see the IMSI in cleartext. If public key cryptography is used between the MS and HAAA to protect the IMSI, the HAAA may need to send the cleartext IMSI to the MA so that the MA can check whether the MT is authorised to register to the FAAA.

The new session key exchange extensions are normal (non-critical) extensions, preferably stored in an MT-AAA authentication extension. Alternatively, the session vendor-specific extensions can be used. If the receiver of the Registration Request does not recognise the extension, the extension is skipped.

Session key exchange between the MT and the FA is independent of the K exchange between the MT and the HA. Thus, a Registration Request contains any one of the following:

A New Session Key Request extension for the FA,
a New Session Key Request extension for the HA,
a New Session Key Request extension for both the FA and the HA,
an SRES extension for the FA,
an SRES extension for the HA,
an SRES extension for both the FA and the HA,
a New Session Key Request extension for the FA and an SRES extension for the HA, and
an SRES extension for the FA and a New Session Key Request for the HA.

Typically, the Registration Reply contains any one of the following:

a New Session Key Reply extension from the FA,
a New Session Key Reply extension from the HA, and
a New Session Key Reply extension from both the FA and the HA.

The format of the New Session Key Request Extension is shown in FIG. 4. The MT may place the New Session Key Request Extension with a sub-type 1 (MT-FA) after the Mobile-Home authentication extension and before the Mobile-Foreign authentication extension (if present). The FA must remove this extension from the request before forwarding the request to the HA.

The MT may place the New Session Key Request extension with a sub-type 2 (MT-HA) before the Mobile-Home authentication extension.

As can be seen from FIG. 4, the format of the New Session Key Request Extension is as follows:

| | |
|---|---|
| Type | Value 134 (skippable) |
| Length | The length of this extension in bytes, not including the Type and Length fields. For the New Session Key Request extension, the length is 26 bytes. |
| Reserved | Reserved for future use. To be set to 0. |
| Vendor/Org-ID | The high-order octet is 0 and the low-order 3 octets are the SMI Network Management Private Enterprise Code of a vendor of a mobile networking service, in network byte order. |
| Vendor Type | NEW_SESSION_KEY_REQUEST_VENDOR_TYPE. This value indicates that the particular type of this extension is a New Session Key Request extension. The administration of the Vendor-Types is done by the Vendor |
| Subtype | 1: MT-FA New Session Key Request extension<br>2: MT-HA New Session Key Request extension |
| Key Lifetime | Maximum key lifetime in seconds, two bytes long. |
| MT_RAND | A random number generated by the MT (16 bytes or 8 bytes). |

This is an example on use of a vendor specific extension. Alternatively, another type of mobile IP specified extension can be used.

Figure 5:
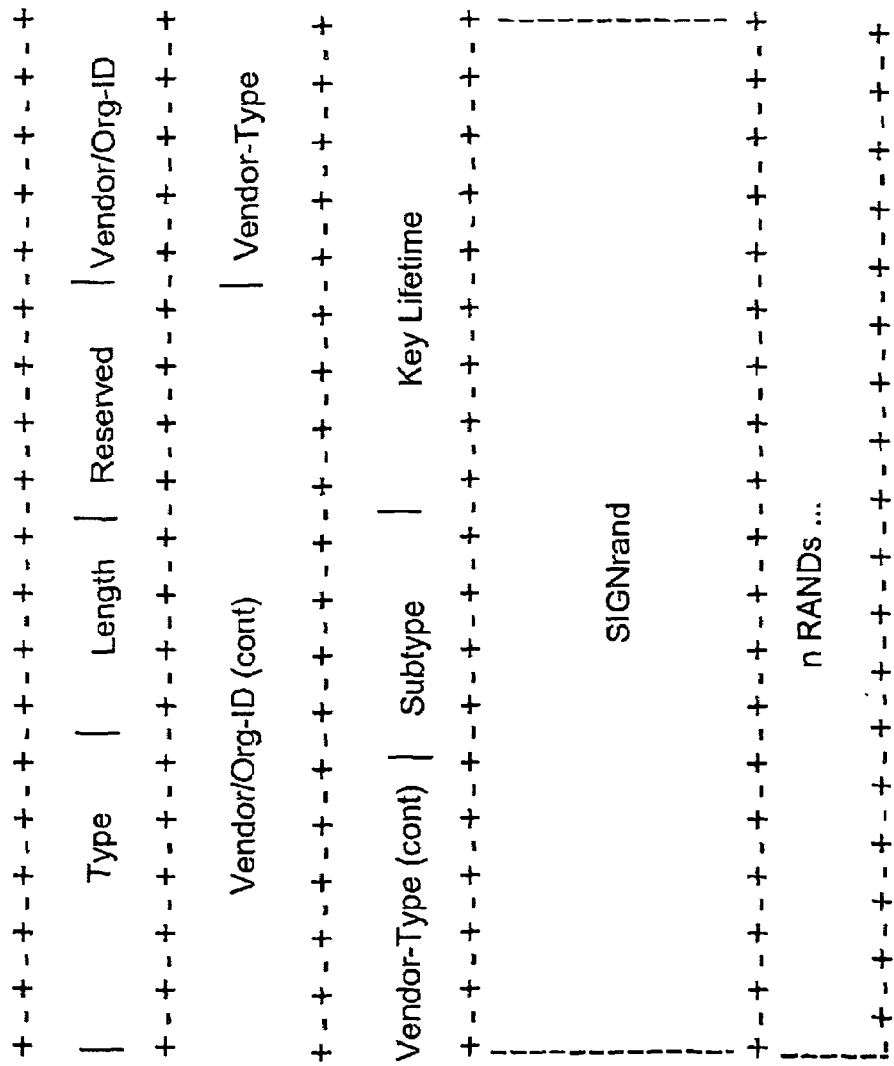
FIG. 5 shows the format of a new shared session key reply extension of the system of FIG. 1.

The format of the New Session Key Reply Extension is shown in FIG. 5. The FA may insert the New Session Key Reply extension with sub-type 1 (MT-FA) in a Registration Reply after the Mobile-Home authentication extension (if present) and before the Mobile-Foreign authentication extension (if present). The HA may insert the New Session Key Reply with sub-type 2 (MT-HA) in a Registration Reply before the Mobile-Home authentication extension.

As can be seen from FIG. 5, the format of the New Session Key Reply Extension is as follows:

| | |
|---|---|
| Type | Value 134 (skippable) |
| Length | The length of this extension in bytes, not including the Type and Length fields. For the New Session Key Reply extension, the length is 42 bits plus the length of n RANDs. |
| Reserved | Reserved for future use. To be set to 0. |
| Vendor/Org-ID | Value, for example 94 (Nokia). The high-order octet is 0 and the low-order 3 octets are the SMI Network Management Private Enterprise Code of vendor in network byte order. |
| Vendor-Type | This value indicates that the particular type of this extension is a New Session Key Reply extension. The administration of the Vendor-Types is done by the Vendor. |
| Subtype | 1: FA-MT New Session Key Reply extension<br>2: HA-MT New Session Key Reply extension |
| Key Lifetime | Remaining key lifetime in seconds |
| SIGNrand | The authenticator for n RANDs, 16 bytes. |
| n * RAND | n GSM RANDs (length n · 16 bytes). |

Figure 6:
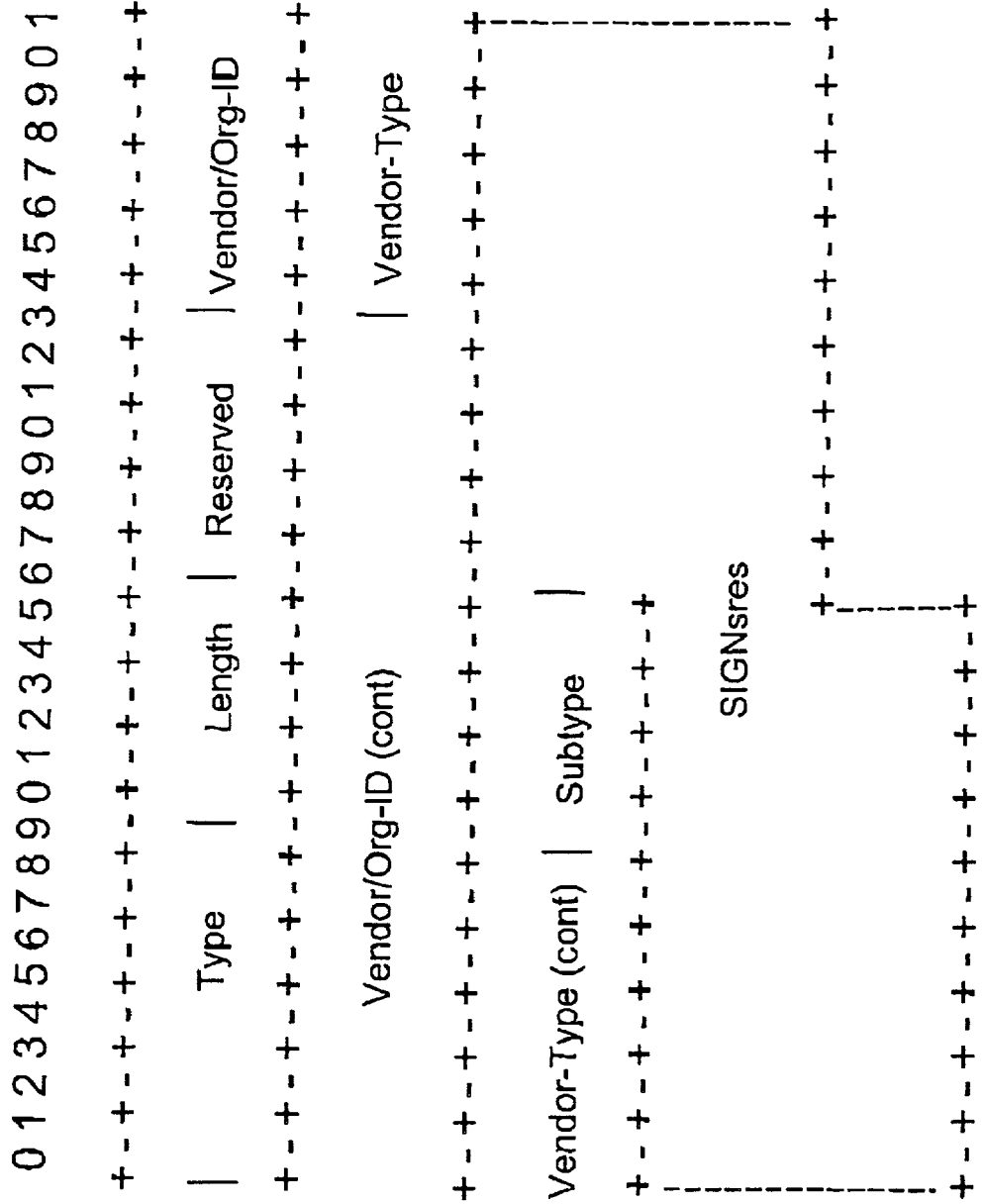
FIG. 6 shows an Signed RESponse (SRES) extension of the system of FIG. 1.

The format of the SRES extension is shown in FIG. 6. The MT may place the SRES extension with sub-type 1 (MT-FA) in a Registration Request after the Mobile-Home authentication extension and before the Mobile-Foreign authentication extension (if present). The FA must remove this extension before forwarding the Registration Request to the HA.

The MT may place the SRES extension with sub-type 2 (MT-HA) in a Registration Request before the Mobile-Home authentication extension.

As can be seen from FIG. 6, the format of the SRES extension is as follows:

| | |
|---|---|
| Type | 134 (skippable) |
| Length | The length of this extension in bytes, not including the Type and Length fields. For the New SRES extension, the length is 23 bytes. |
| Reserved | Reserved for future use. To be set to 0. |
| Vendor/Org-ID | The high-order octet is 0 and the low-order 3 octets are the SMI Network Management Private Enterprise Code of vendor in network byte order, as defined in the Assigned Numbers RFC [Assigned numbers]. |
| Vendor-Type | This value indicates that the particular type of this extension is an SRES extension. The administration of the Vendor-Types is done by the Vendor. |
| Subtype | 1: MT-FA SRES extension<br>2: MT-HA SRES extension |
| SIGNsres | The response calculated by the MT, 16 bytes. |

In another embodiment of the invention, the shared session key exchange messages between the MT and the FA are transmitted by extending agent discovery messages to include IMSIs and RANDs.

In yet another alternative embodiment, an opaque authenticator field is used in the authentication extension. The beginning of this extension is used for sending RANDs, key lifetimes and other shared session key exchange parameters. The key exchange parameters are included in the calculation of the authenticator.

If the parameters are transmitted in a separate extension before the authentication extension, the data for key exchange becomes automatically included in the computation of the authentication extension. Furthermore, using separate extensions makes the system easier to implement. The authenticator is the result of the MAC function, for example a SIGNrand as computed according to step 2.

In a further embodiment, instead of using well-known SPIs for the SIM-generated security contexts, SPIs are communicated in the new shared session key exchange messages.

EXAMPLE 2

A Wireless LAN

Figure 7:
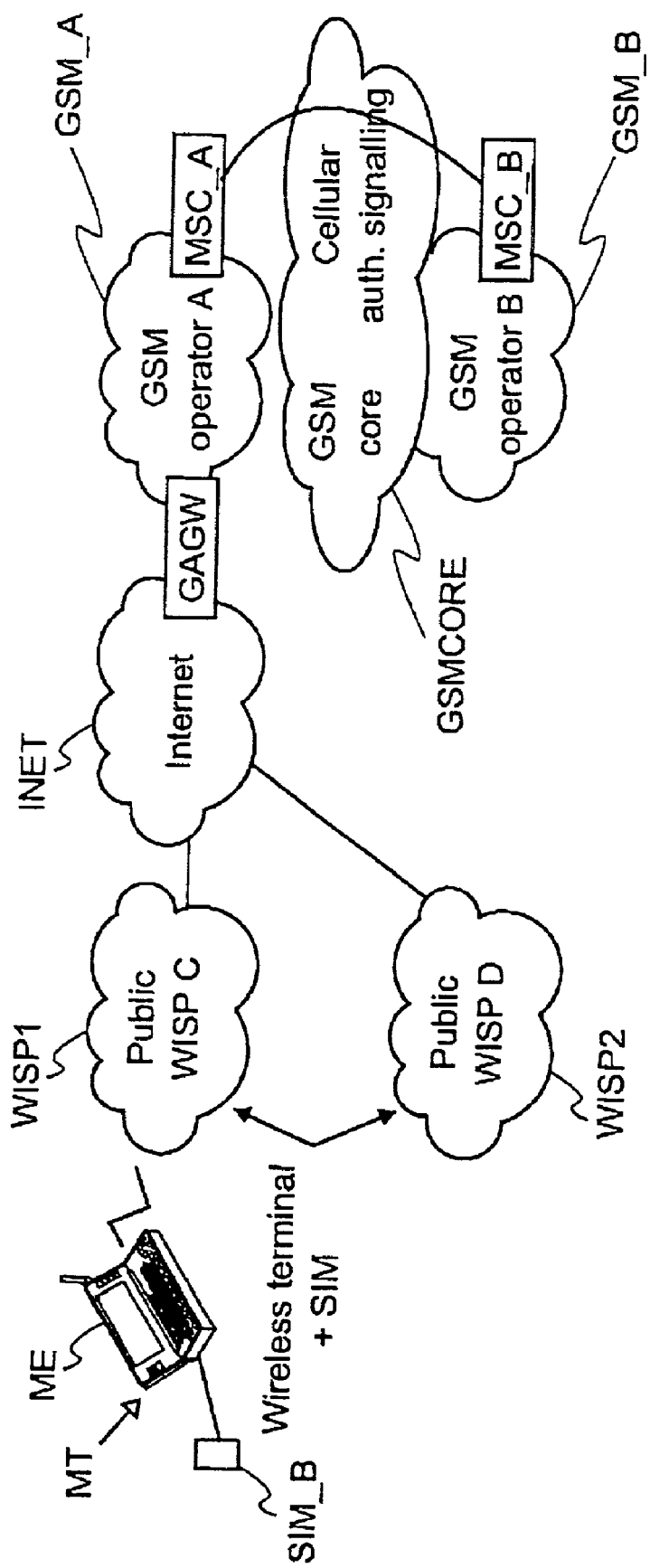
FIG. 7 shows architecture of a mobile communication system according to another embodiment of the invention.

FIG. 7 shows an architecture of a mobile communication system according to another embodiment of the invention. The system comprises a mobile node MT that is a data terminal, two public Wireless IP access networks (WISPs) WISP1 and WISP2, the Internet INET, a first GSM telecommunications network GSM_A and a second GSM telecommunications network GSM_B connected to a GSM core GSMCORE.

The public wireless IP access networks (WISP1,WISP2) offer wireless broadband IP services to allow the MT to roam in public hot spots, such as hot spots located, for example, to hotels and airports. Each WISP can be operated either by a GSM telecommunications network operator or by a private ISP with a roaming agreement with a GSM telecommunications network operator. The roaming agreement is essential for SIM authentication.

The MT functions as a mobile node. It can connect to a WISP. The MT can also roam from one network to another using a known technique. In WLAN, the roaming from one WLAN hot spot to another is referred to as WLAN roaming service. The WISPs have access to the Internet INET.

The MT has an equipment part ME and SIM_B provided for use with the second GSM telecommunications network GSM_B. The MT may not be a GSM compliant mobile station. In this case a user of the MT can access the second GSM telecommunications network GSM_B by providing a GSM mobile station with the SIM_B. Indeed, in this example, the MT is a laptop computer equipped with a WLAN adapter card (not shown) and a smart card reader (not shown) that can use the SIM_B. Alternatively, the MT is a device having a GSM mobile station part for communicating with GSM telecommunications networks and a WLAN terminal part for communicating with WLANs.

Both GSM telecommunications networks GSM_A and GSM_B comprise respective Mobile Switching Centres MSC1 and MSC2. The GSM core couples these MSCs together. Furthermore, the first GSM telecommunications network has a GSM/GPRS Authentication and Billing Gate-Way (GAGW) coupling it to the Internet INET. The GAGW is the GSM telecommunications network operator's entity which provides the GSM authentication services to WISPs and collects charging information.

GSM_B is connected to the GSMCORE and can further be connected through the GSMCORE and the GAGW to the WISP1 (to which the MT is connected) and to the MT for authentication and billing purpose as will be described in more detail later.

A GSM/GPRS -SIM based user mobility management functionality (user authentication and billing) can be used for public WLAN access zone authentication and billing functions. The SIM based authentication provides a relatively trustworthy verification of the subscriber's identity (authentication) for charging of the use. The GSM core GSMCORE provides roaming services for a GSM mobile station roaming between various operator networks. Advantageously, the roaming service is implemented using existing SIM cards and the GSM infrastructure. Consequently, the WISP roaming should not require any extra security keys from the MT. Furthermore, all the GSM users who obtained WLAN roaming service from their home operator have requisite the MT, SIM and necessary roaming software to be able to access the public network. A home operator provides the roaming MT with SIM_B for authenticating with it. GSM_B is alternatively a GSM telecommunications network supporting GPRS.

The operation of the system of FIG. 7 will now be described. The user has a GSM agreement with the operator of the GSM_B that is the user's home network operator. The network operator B has signed a roaming agreement with the operator A of GSM_A. The GSM telecommunications network operator A has partner arrangements with the operators of WISP1 and WISP2, referred to, respectively, as operators C and D. The roaming user with the SIM_B may roam from WISP1 to WISP2. Both WISPs send authentication request messages to the operator of GSM_A. The GSM core network roaming functionality is used for relaying the authentication messages to the subscriber's home operator (operator of GSM_B). The architecture allows users of either GSM telecommunications network to roam with their MTs between WISPs, although the WISPs have direct connection only to operator A network GSM_A.

A roaming user need not have a pre-established customer relationship with a WISP. Instead, the roaming user may rely on his customer relationship with his home GSM telecommunications network in order to provide authentication and billing in the WLAN. WISP access is charged to the roaming user's GSM bill via a GSM telecommunications network operators' authentication gateway.

Here, these roaming services are used for allowing an MT to be authenticated and charged using a SIM both for accessing the GSM core as well as public IP access networks. The GSM telecommunications network operator bills the user for both the authenticating/roaming services and for the use of public IP access networks. Then, the GSM telecommunications network operator reimburses the use of public IP access networks for their operators.

In an alternative embodiment of the invention, the GSM telecommunications network operator may provide the subscriber with a WISP roaming SIM, which does not allow use of the GSM radio services. Such a dedicated SIM can be used to authenticate and debit services provided by a WLAN.

As is known from the GSM, the home GSM network stores customer information, such as authentication codes and user identity. Typically, this information is stored in a GSM Home Location Register (HLR) of an MSC. The GSM telecommunications network operator provides the IP based authentication and charging interface for one or several WISP operators, possibly also or only for corporate access solutions.

The GAGW supports seamless roaming between various GSM telecommunications network operators. The WISPs send all the authentication and billing information to the GAGW. The GAGW uses GSM core signaling known from GSM to convey the authentication and billing information to the corresponding home GSM telecommunications network operator. The signalling of billing information between different GSM telecommunications networks can be arranged in a manner similar to conventional roaming of a mobile telephone in a foreign GSM telecommunications network. In this case, the foreign GSM telecommunications network charges the home GSM telecommunications network for its service in arranging the telephone call.

In the system of FIG. 7, the home operator stores the charging records and sends the bill to the user. The WISP generates a billing record describing the billed services. The billing can be based on any of the known principles or combination of them, for example on flat rate, usage time, number of packets or access bandwidth. The GSM network (GAGW) transmits the WISP originated records to the existing GSM billing system.

The MT supports authentication by using a SIM card. In an alternative embodiment, the MT supports one or more other authentication mechanisms, for example smart card authentication for corporate network access. Such an MT contains authentication software and the smart card but need not have keys for public access or any other security association.

Figure 8:
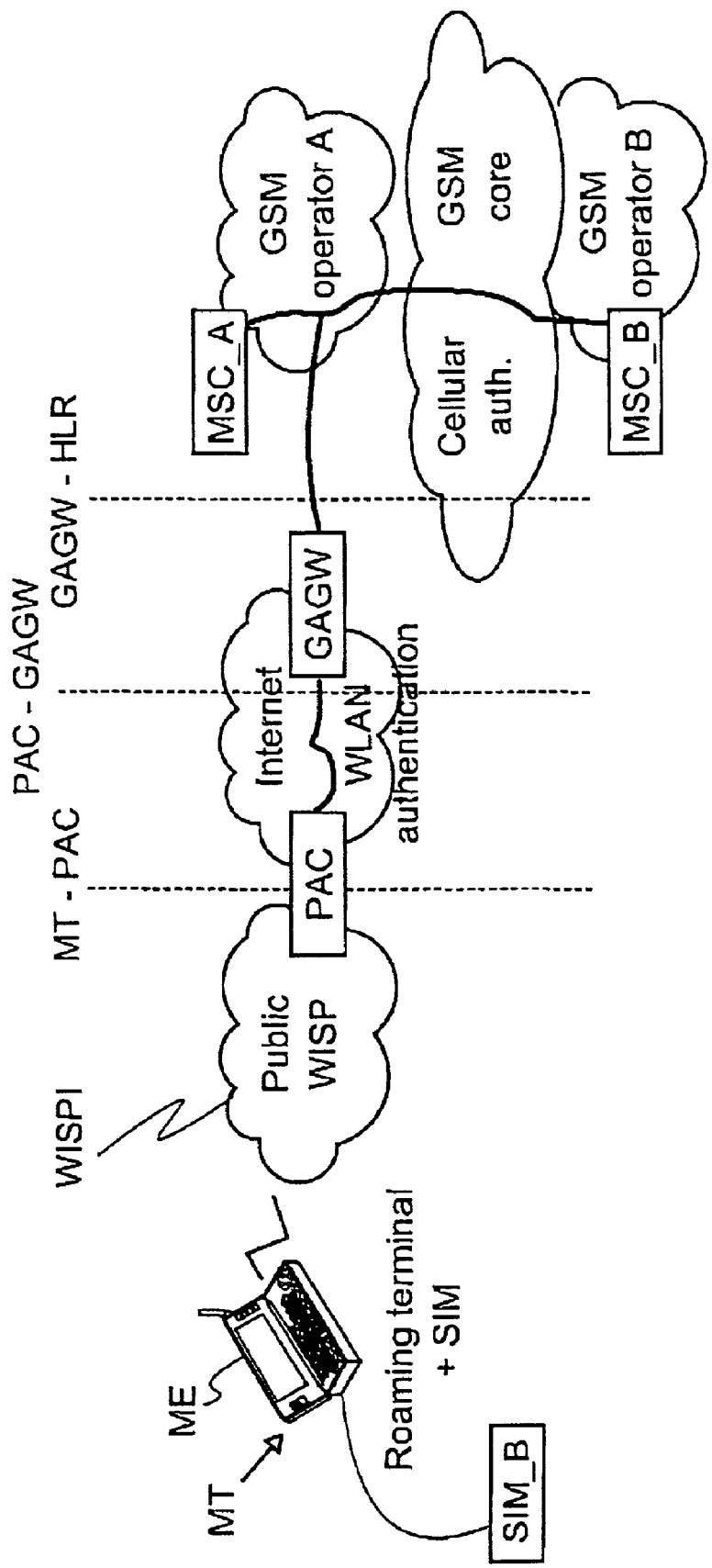
FIG. 8 shows significant functional blocks of the system of FIG. 7.

FIG. 8 shows significant functional blocks of the system of FIG. 7. FIG. 8 only shows a single WISP although it is understood that more than one WISP and more than one GSM telecommunications network may be present. FIG. 8 shows three important functional elements of the system: the MT, a Public Access Controller PAC and the GPRS/GSM Authentication and Billing Gateway GAGW. The GAGW is a dedicated entity of the GSM telecommunications network that interfaces the GSM/GPRS network with an IP network (for example, the Internet or a wide area IP network). The GAGW also offers the necessary WLAN-cellular roaming functions, in particular those related to authentication and billing services.

The PAC is the WISP's network entity which controls access from the radio access network to the Internet services. In this example, the PAC allocates an IP address to the MT and authenticates the MT before connection to the Internet is established. The PAC relays the authentication messages between the MT and the GAGW, collects the billing record and sends it to GAGW. The PAC also relays user data traffic between the MT and the Internet.

The SIM authentication is a complementary service for the PAC and the PAC supports additionally other authentication mechanisms such as password based authentication.

The interfaces of the system will now be described.

The MT-PAC interface is an IP based interface that is provided with authentication functionality. The authentication is designed so that it can be embedded in a well-known standard IP protocol or implemented as an extension to the existing protocol. The MT and PAC are identified using their IP addresses in this interface.

The PAC-GAGW interface is an IP based interface that uses a suitable authentication protocol. Typically, a single GAGW supports several PACs simultaneously. The GAGW identifies various PACs by using their IP addresses. In this interface, the MT identification is based on an IMSI code stored on the SIM_B.

The GAGW-HLR interface is implementation and vendor specific. The GAGW hides the cellular infrastructure from PACs. Therefore, the PAC-GAGW interface is always the same although the underlying cellular network may be of a different type (GSM, GPRS) or provided by a different vendor.

Figure 9:
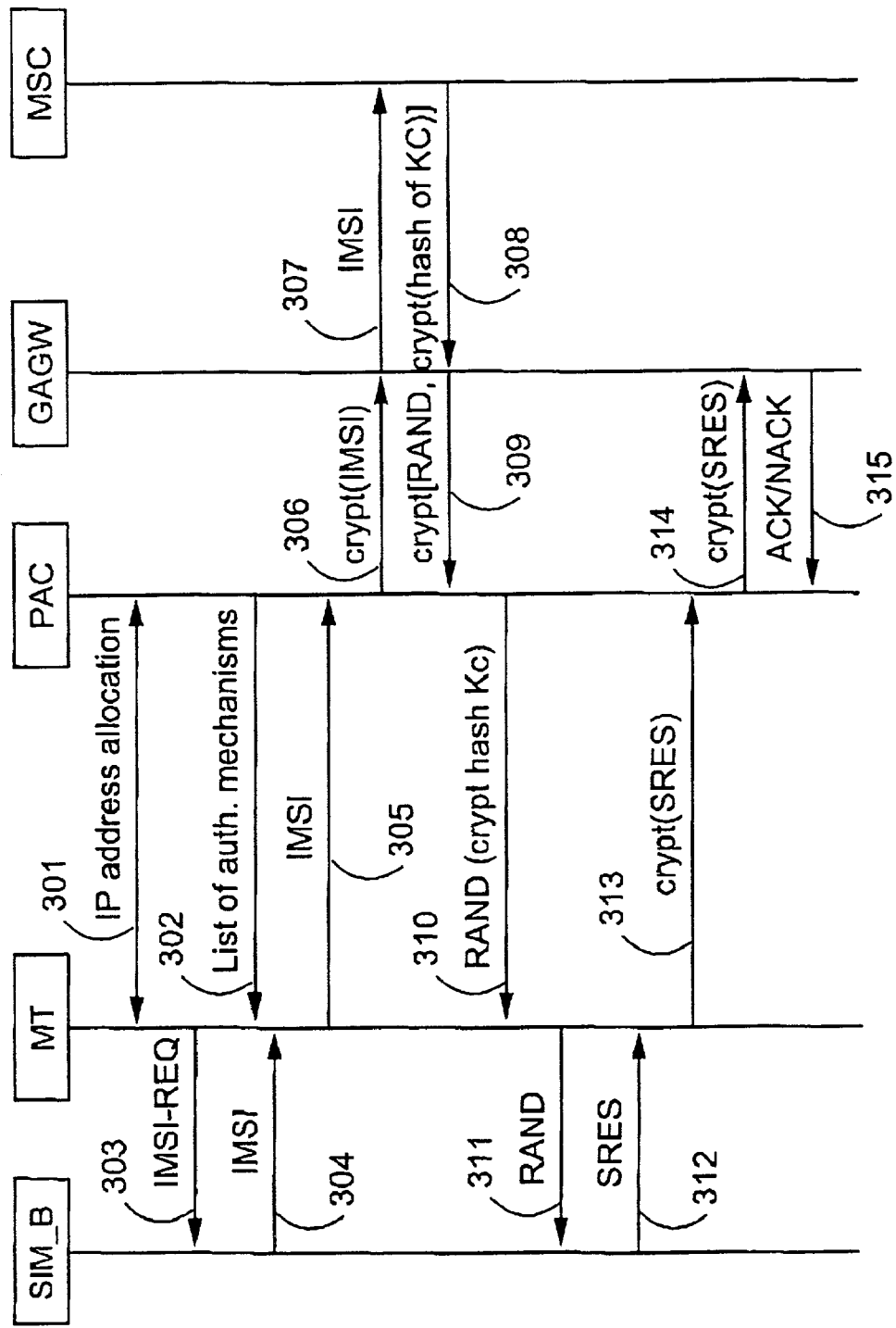
FIG. 9 shows the major signalling events of the system of FIG. 7.

FIG. 9 shows the major signalling steps of the system of FIGS. 7 and 8. The process of authenticating the MT to the PAC is typically triggered when the MT attempts to connect to the public access network. In this case, the MT acquires an IP address via a dynamic host configuration protocol (DHCP) server (not shown). The DHCP protocol and appropriate servers are well known in the art. The authentication has to be completed before the network beyond the PAC can be accessed. The MT triggers the authentication by roaming software. In an alternative embodiment, the authentication is automatically triggered when the MT tries to access to the network using SIM authentication and the roaming application is running.

An overview of the authentication is next explained by reference to the messages used during the authentication process:

301. The MT communicates with the PAC to connect to the WISP1 and to obtain an IP address from a DHCP server.
302. The PAC sends information concerning the supported authentication mechanisms, such as SIM authentication, Public Key Infrastructure (PKI) or pre-shared key.
303. The MT detects that SIM authentication is supported. The ME requests the IMSI from the SIM_B.
304. The SIM_B responds to the IMSI request 303 by sending the IMSI to the ME.
305. The MT forms a Network Access Identifier that is the IMSI in a Network Access Identifier (NAI) format, as explained in beginning of description of the example 1. The MT establishes a dynamic security association with the PAC, for example using Diffie-Hellman, and sends the NAI encrypted over the temporary secure channel. In an alternative embodiment, the NAI is sent as cleartext without encryption.
306. The PAC decrypts the NAI, and forwards it in a data packet, again encrypted, to the GAGW over the secure PAC-GAGW interface. The IP address of the GAGW is statically configured in the PAC. A secure channel is formed between the PAC and the GAGW using their previously arranged shared secret.
307. The GAGW verifies that the data packet came from a valid PAC, decrypts the packet, checks the NAI, extracts the IMSI and sends the IMSI with an authentication request to the nearest MSC. Next, the MSC analyses the IMSI to find out the home HLR of the subscriber indicated by the IMSI. Then, the MSC forwards the authentication request to the home HLR.
308. The home HLR forms a set of one or more GSM authentication triplets (RAND, SRES, Kc) and sends the set to the originator MSC which forwards the set to the GAGW.
309. The GAGW forms a packet containing the RANDs and a cryptographic checksum of the RANDs, generated using at least the Kcs. The GAGW preserves the SRESs for later use in a subsequent step 314.
310. The PAC decrypts the packet and relays the RANDs and the cryptographic checksum to the MT.
311. The MT inputs the RANDs to the SIM_B, which calculates corresponding Kc and SRES values.
312. The MT checks that the Kcs match with the cryptographic checksum given by the PAC. If they match, the MT knows that the PAC has a connection to the HLR and so the PAC can be trusted.
313. The MT generates a cryptographic checksum for the SRESs with Kcs and sends the checksum to the PAC.
314. The PAC relays the checksum of the SRES to the GAGW. The GAGW checks whether the checksum matches with the SRESs it received from the MSC in step 308. If it matches, the GAGW sends an acknowledge message ACK to the PAC. If it does not match, then the GAGW sends a negative acknowledge NACK to the PAC.
315. If the PAC receives a positive acknowledge message ACK confirming successful authentication, it completes the authentication by opening the access to the Internet. If the PAC receives a negative acknowledge message NACK, it refuses to open access to the Internet.

In an alternative embodiment, the IMSI is used in the preceding steps instead of the NAI.

The following tables list the parameters that are carried between elements of the system:

TABLE 1

Main parameters transferred between the MT and the GAGW

| Parameter | Direction to | Encryption | Explanation |
|---|---|---|---|
| IMSI/NAI | GAGW | Yes | User ID for cellular network side |
| RAND | MT | No | Random authentication Challenge |
| SRES | GAGW | Yes | Authentication response to the HLR |
| Hash(K_MT) | MT | Yes | Authentication checksum for the MT |
| Hash(K_GAGW) | GAGW | Yes | Authentication checksum for the GAGW |

TABLE 2

Main parameters transferred between the MT and the PAC

| Parameter | Direction to | Encrypted? | Explanation |
|---|---|---|---|
| IMSI/NAI | PAC | Yes | User ID for cellular network side |
| Bill_ind | MT | | Information of the costs |

TABLE 3

Main parameters transferred between the PAC and the GAGW

| Parameter | Direction to | Encrypted? | Explanation |
|---|---|---|---|
| Bill_ind | PAC | No | Access pricing information |
| User_class | PAC | Yes | User class/profile (business, consumer, . . .) |
| K_RAN | PAC | Yes | Air interface encryption key |
| CDR | GAGW | Yes | User's billing record (structure tbd) |

Advantageously, an optional user_class parameter is used for defining the quality of service, for example the maximum bandwidth for a particular user.

Figure 10:
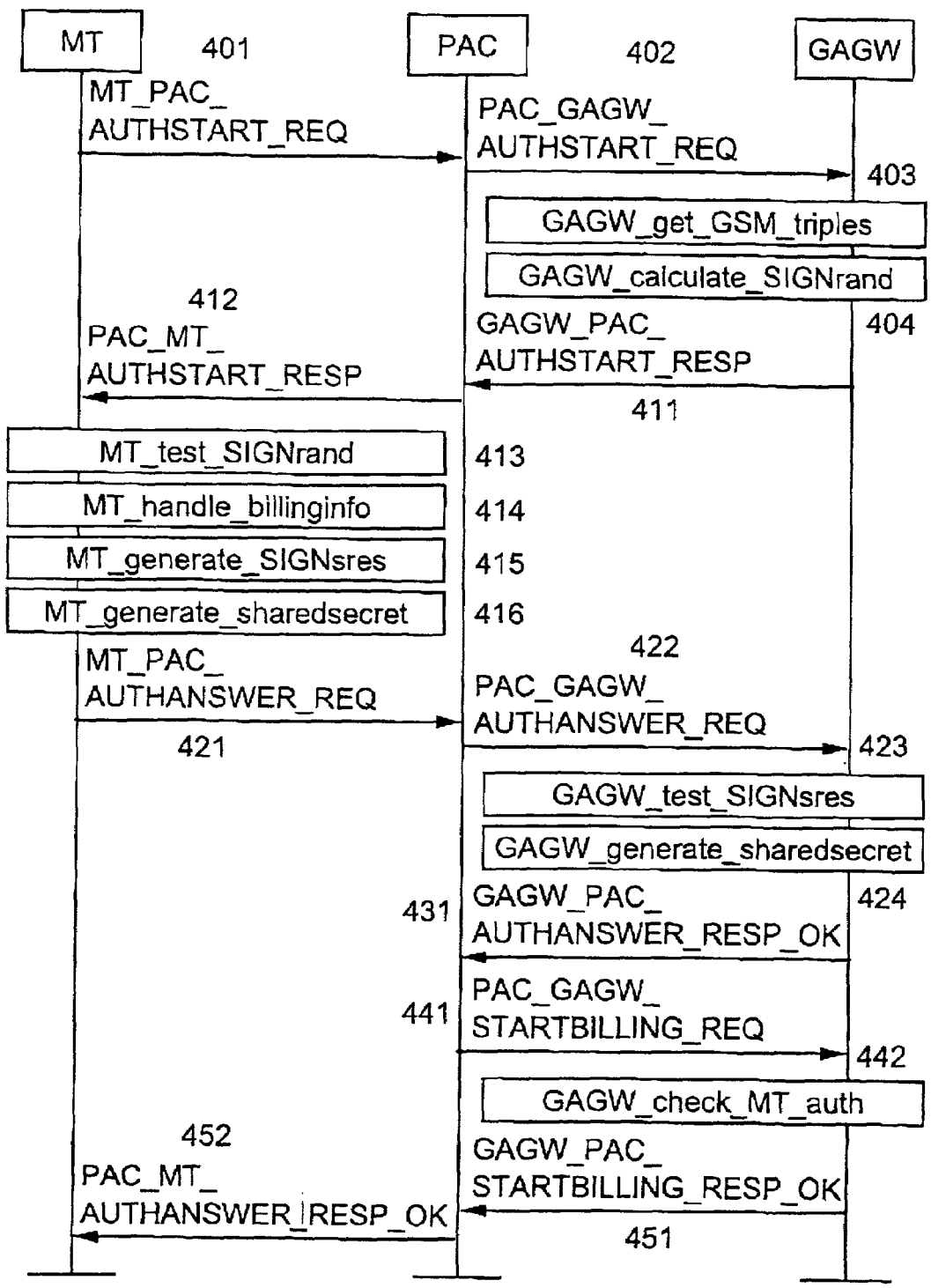
FIG. 10 shows a detailed signalling chart of an authentication operation of the system of FIG. 7.

FIG. 10 shows a detailed signalling chart of an authentication of the system of FIGS. 7 and 8. The chart presents the following steps:

(Step 401) The MT sends an MT originated authentication starting request MT_PAC_AUTHSTART_REQ containing the NAI having the IMSI. The request typically also contains a protection code MT_RAND (known also as nonce in the context of mobile IP).

(Step 402) The PAC receives the MT_PAC_AUTH-START_REQ from the MT and requests for GSM triplets by sending to the GAGW a message PAC_GAGW_AUTH-START_REQ, also containing the NAI and the MT_RAND.

(Step 403) The GAGW obtains the GSM triplets from the home GSM telecommunications network. One triplet suffices, but the GSM telecommunications network may return a plurality of triplets, in which case either some of the triplets are discarded or stored for later use, or more advantageously, they all are used to generate a stronger key. The home GSM telecommunications network is recognised using the NAI.

(Step 404) The GAGW generates K, using an encryption algorithm, of at least the GSM session key(s) Kc. Advantageously, the MT_RAND is also used in the encryption. The GAGW encrypts the GSM RAND(s) of the GSM triplets, computes a cryptographic checksum, or a Message Authentication Code MAC, based on the RAND(s) and the K, and prepares an authentication start response message GAGW_PAC_AUTHSTART_RESP. The encryption between the GAGW and the PAC is based on their own shared secret.

(Step 411) The GAGW sends to the PAC an authentication start response message GAGW_PAC_AUTHSTART_RESP containing the RANDs, the MAC, the MT_RAND, a billing information code and a billing information MAC computed for the billing information code. Typically, the authentication start response message additionally contains a field for a session timeout parameter for determining the validity period of the new K to be generated and a field for the state of the session.

(Step 412) The PAC forwards to the MT the authentication start response message GAGW_PAC_AUTHSTART_RESP as a PAC_MT_AUTHSTART_RESP message.

(Step 413) The MT tests with the SIGNrand that the parameters carried by the GAGW_PAC_AUTHSTART_RESP and by the PAC_MT_AUTHSTART_RESP indeed originate from the GSM telecommunications network.

(Step 414) The MT handles the billing information it received from the GAGW. Typically, it provides the user with information relating to the price of the service requested by the user. Usually, this price is based on at least one of the following: a flat rate fee, a time based billing, number of data packets sent to or from the MT, and the Quality of Service QoS. The MT then asks the user whether the service should be obtained with the price given. The MT receives an answer from the user.

(Step 415) The MT generates a MAC of the SRESs to be used for responding to the GAGW.

(Step 416) The MT generates then an access secret Kpac_MT using at least the Kcs.

(Step 421) The MT generates and sends an MT_PAC_AUTHANSWER_REQ message to the PAC. The message contains in the state field an answer of the user showing whether the user accepted the billing for the service, the MAC of the SRESs, a MAC of the billing code, and the MT_RAND (as all the messages sent during an authenticating session).

(Step 422) The PAC generates a PAC_GAGW_AUTH-ANSWER_REQ containing the data of the MT_PAC_AUTHANSWER_REQ message and additionally the NAI and the IP address of the PAC.

(Step 423) The GAGW tests the MAC of the SRESs to verify that the data sent by the MT carried by the PAC_GAGW_AUTHANSWER_REQ has not been tampered with.

(Step 424) If the GAGW gets a positive answer to the test of the previous step, it generates the access key Kpac_MT in a manner similar to that used by the MT in step 416 and then proceeds to the step 431.

(Step 431) The GAGW sends to the PAC a message GAGW_PAC_AUTHANSWER_RESP_OK. The message contains the MT_RAND and codes filter_id, Kpac_MT and SIGNresult. The filter_id code is optional and indicates the user class of the subscriber. This can be used in defining a QoS, for example a high quality connection for more paying business users. The SIGNresult is a MAC of the data in the message for ultimately verifying to the MT that the reply from the GAGW is not altered on the way to the MT.

(Step 441) The PAC responds to the GAGW by a PAC_GAGW_STARTBILLING_REQ message requesting the GAGW to start the billing. The message contains the NAI and a session ID (the MT_RAND).

(Step 442) The GAGW checks the answer from the MT for verifying that the MT has permitted the billing.

(Step 451) If the MT has permitted the billing, the GAGW sends to the PAC a message GAGW_PAC-STARTBILL-ING_RESP_OK to indicate the start of billing.

(Step 452) The PAC sends to the MT a PAC_MT_AUTH-ANSWER_RESP_OK message containing the SIGNresult.

(Step 453) The MT receives the PAC_MT_AU-THANSWER_RESP_OK message and checks the SIGNresult it contains. If the SIGNresult is correct, the MT can inform the user of the start of billing.

The MAC of the billing code is computed at least using the Kcs so that the PAC cannot tamper with the billing code.

In the message PAC_MT_AUTHANSWER_RESP_OK, the MT is notified of the term of the authentication. The MT re-authenticates itself before the authentication term expires. If it does not re-authenticate, the connection of the MT to the PAC is released and the MT can authenticate itself again.

Advantageously, the MT receives billing information and decides how to handle it. Advantageously, the user of the MT can define a billing information handling policy. This policy can be used to define, for example, that no billing information is presented to the user in a re-authentication or normal authentication case. The handling of the billing information does not affect the protocol of messaging between the different entities (MT, PAC, GAGW, MSC and HLR).

Figure 11A:
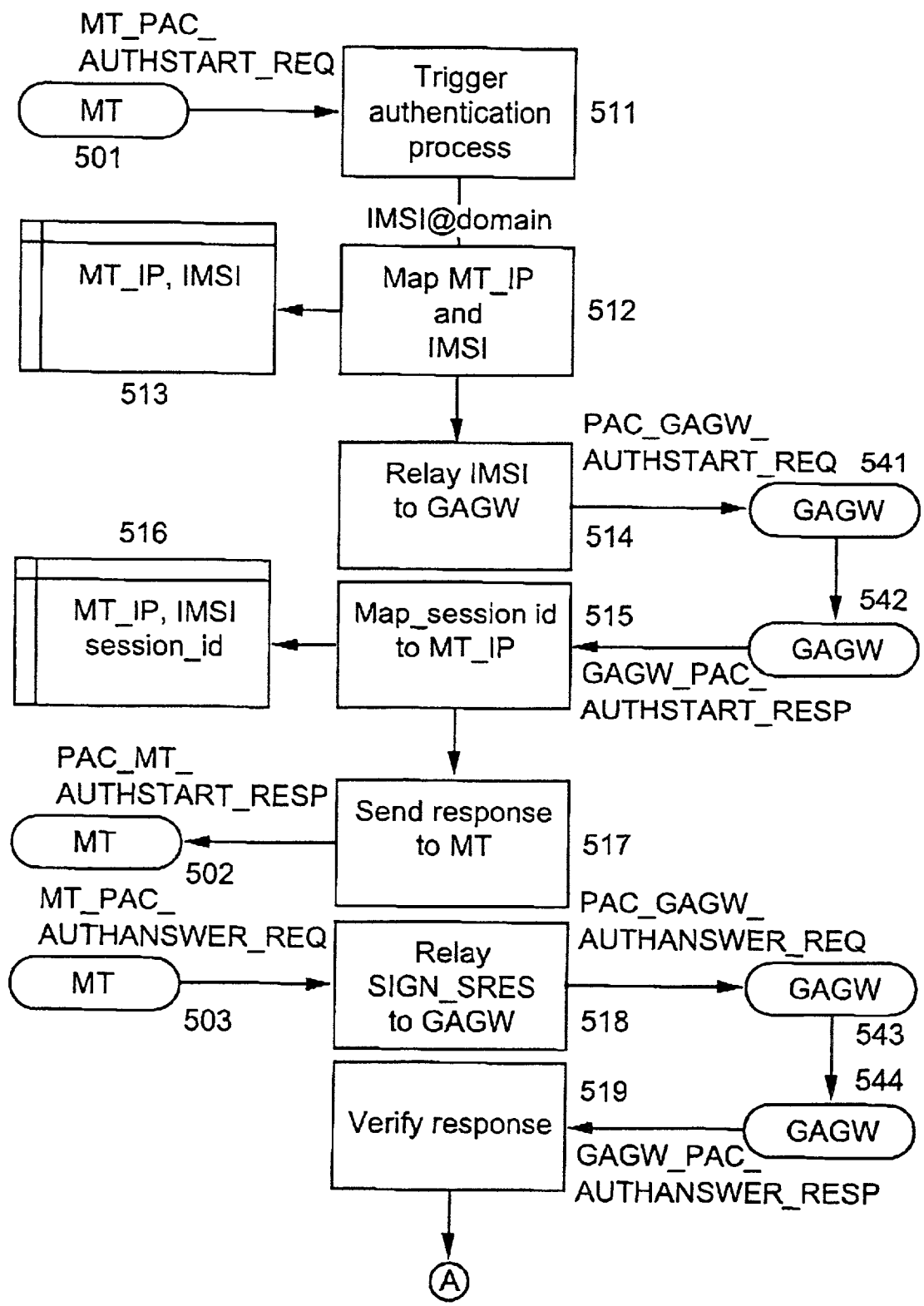
FIGS. 11a and 11b form together a flow chart showing the functionality of a Public Access Controller during the authentication of the system of FIG. 7.
Figure 11B:
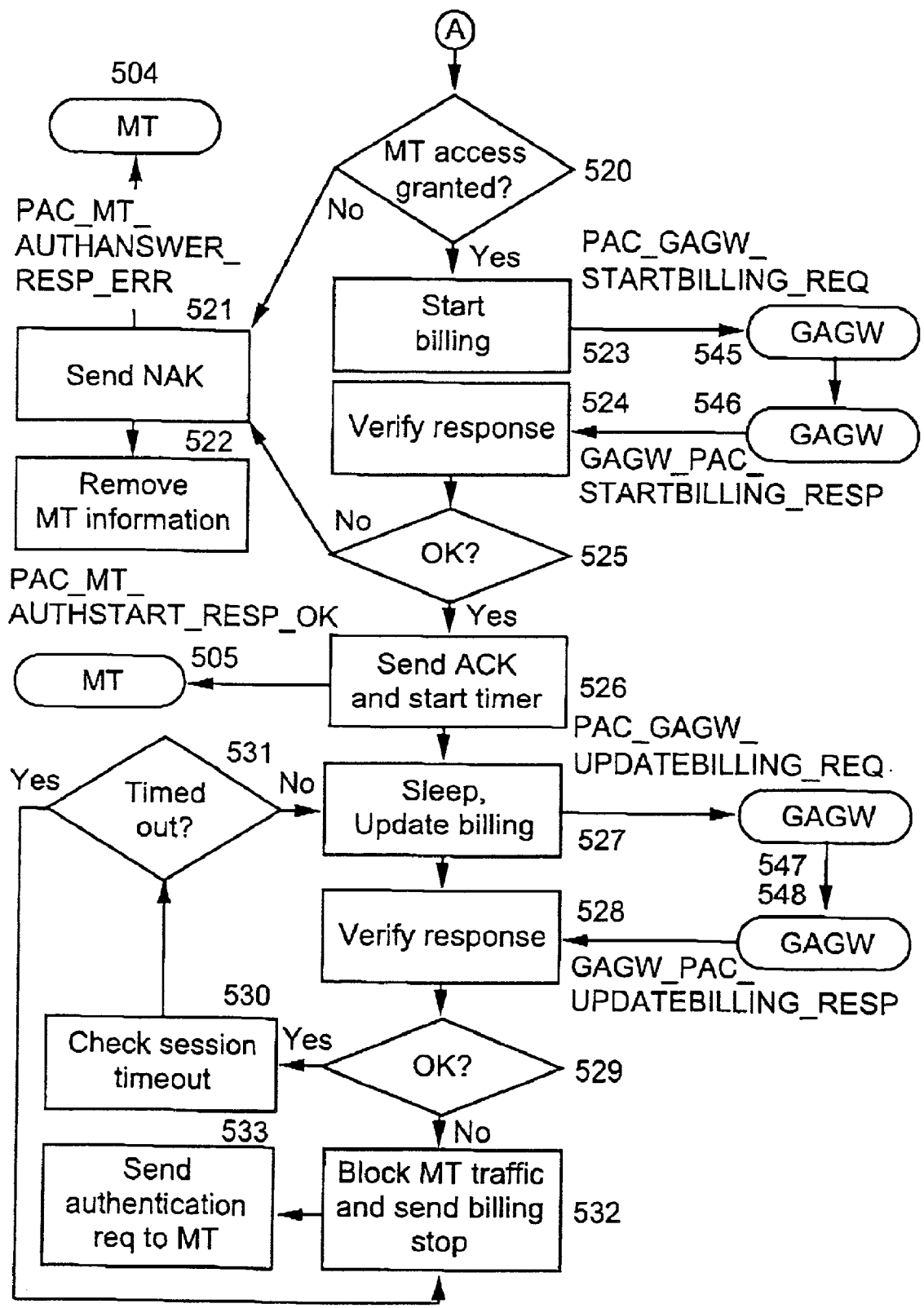
Figure 12A:
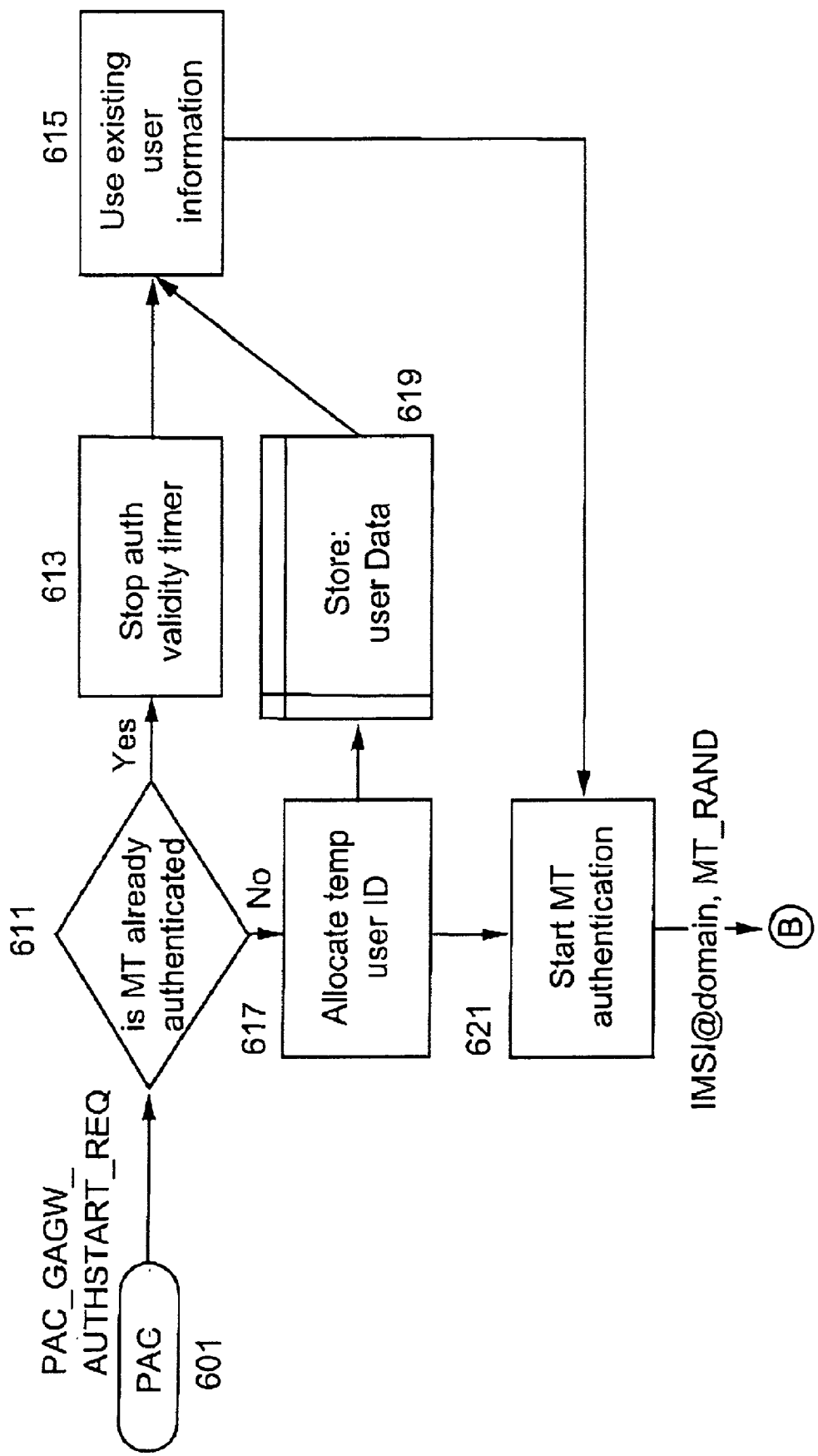
FIGS. 12a to 12d form together a flow chart showing the functionality of the Global System for Mobile Communications/General Packet Radio Service Authentication and billing Gateway during the authentication of the system of FIG. 7.
Figure 12B:
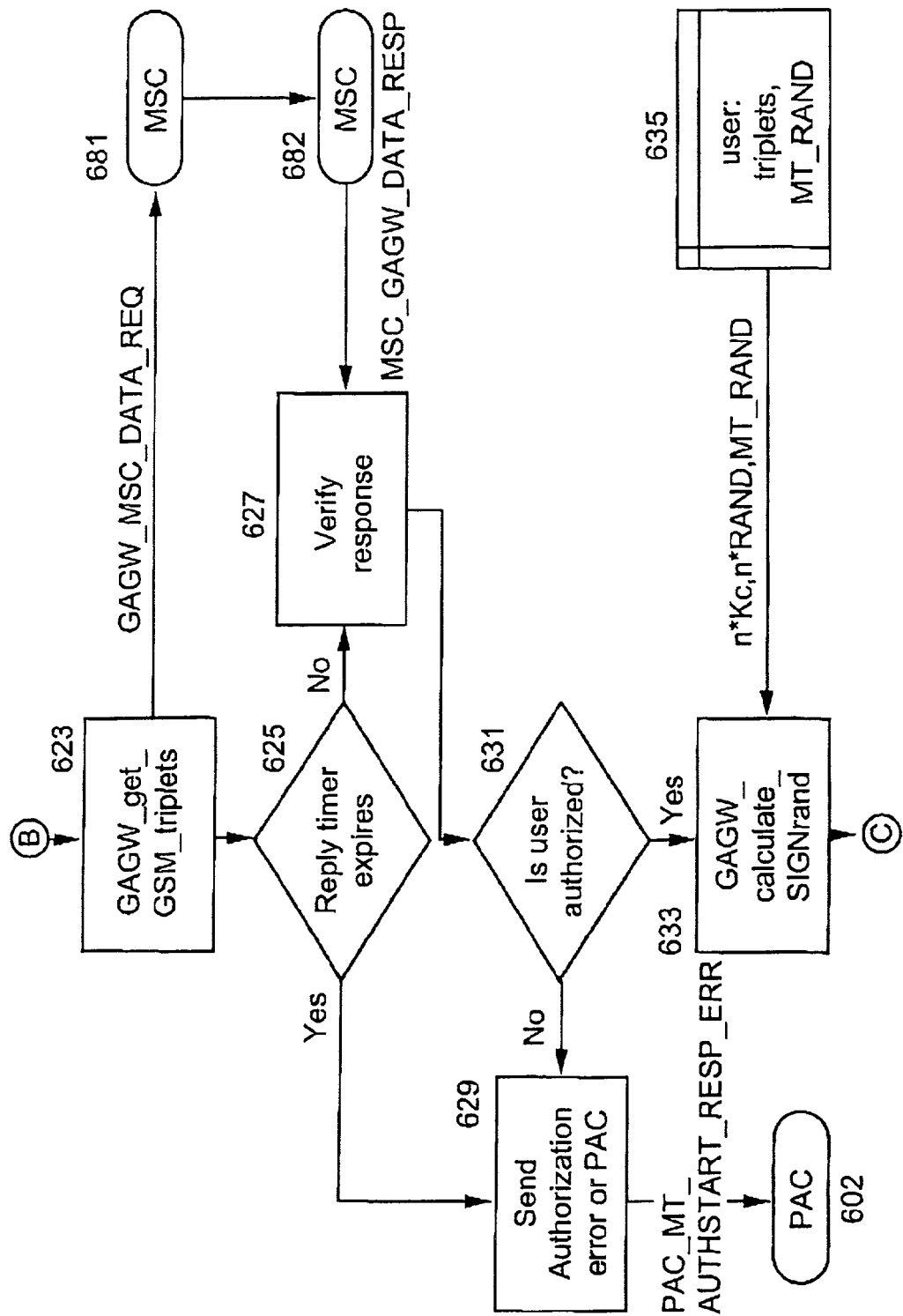
Figure 12C:
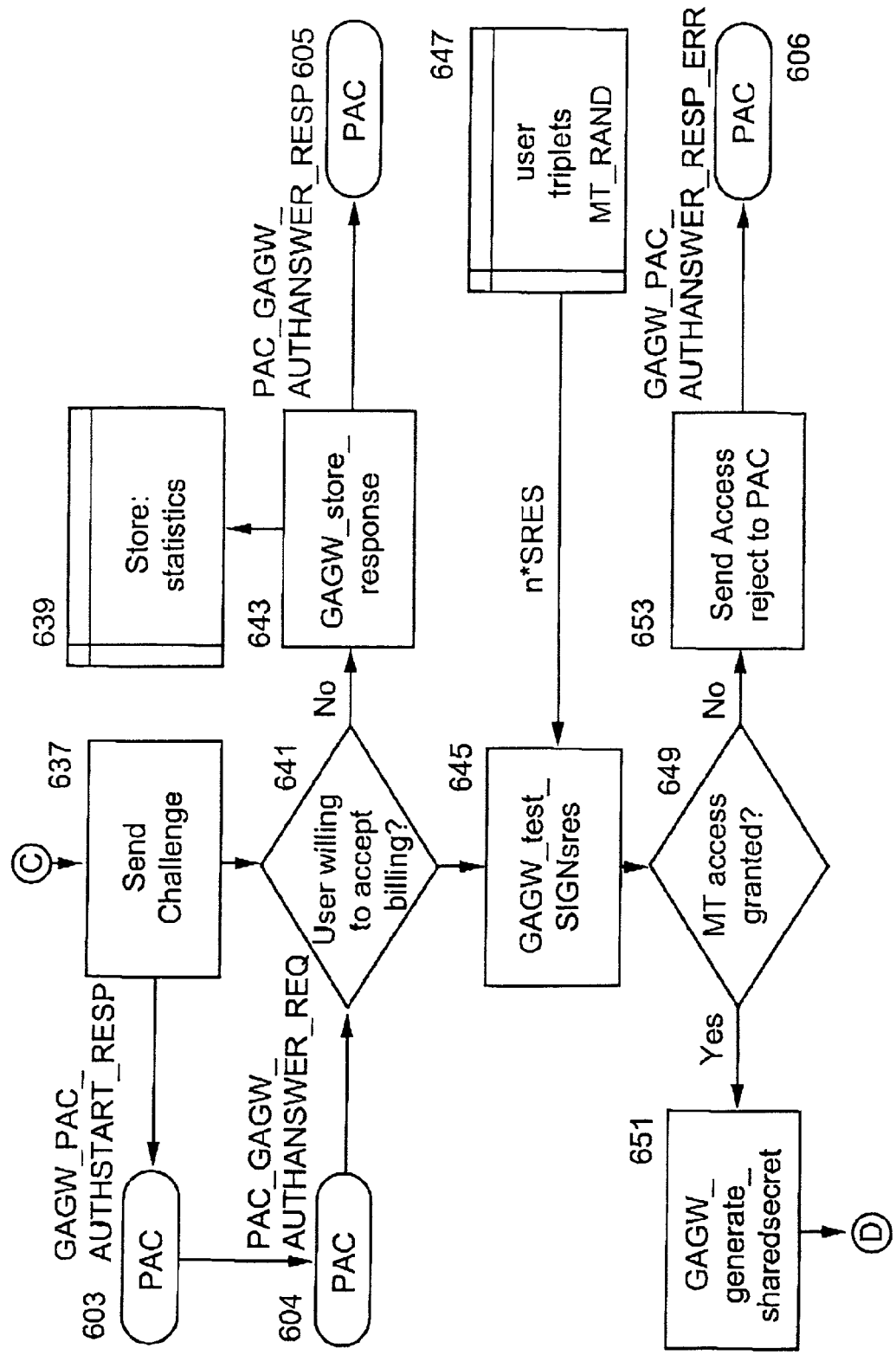
Figure 12D:
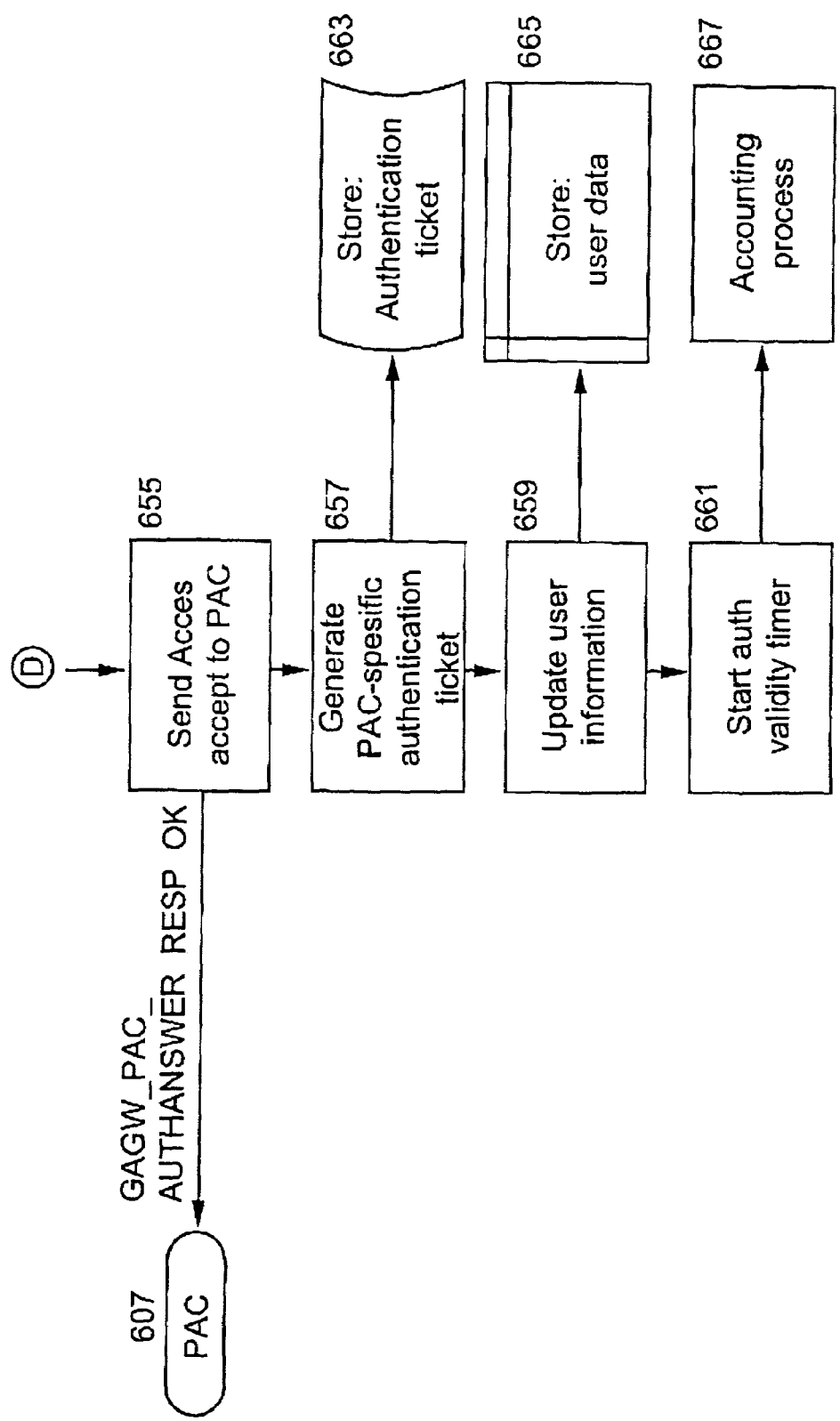

FIGS. 11a and 11b form together a flow chart showing the functionality of the PAC during the authentication. In this figure, all of the blocks relate to the PAC except those that are marked as "MT" or "GAGW". The drawing will be described by referring to each of the blocks by their reference sign.

The operation starts from block 501. The MT requests authentication from the PAC by sending an MT_PAC_AUTHSTART_REQ message containing the MT_RAND and the NAI to the PAC, thus triggering the authentication process there (block 511). The PAC maps (block 512) an IP address MT_IP for the MT. The PAC checks first whether it already has an IP address mapped for that NAI. If it has, it retrieves the mapping from a database record (block 513). Otherwise it obtains an IP address and stores it with the NAI to a database for future use.

After mapping (block 512) of the IMSI with an IP address, the PAC relays (block 514) the NAI to the GAGW (block 541) in a PAC_GAGW_AUTHSTART_REQ message. The GAGW responds (block 542) by a GAGW_PAC_AUTH-START_RESP message containing a random number RAND to be used as a challenge. In block 515, The PAC receives the challenge and maps a session ID code SES- SION_ID to the MT_IP. Next, the PAC updates the database record (block 516) by storing the SESSION_ID with the MT_IP and the IMSI. Then, the PAC sends (block 517) the challenge RAND to the MT in a PAC_MT_AUTHSTART_RESP message. The MT receives (block 502) the message, generates and responds (block 503) with an MT_PAC_AUTHANSWER_REQ message containing a cryptographic checksum SIGN_SRES corresponding to the challenge and the challenge itself. The PAC receives the SIGN_SRES and relays (block 518) it to the GAGW which checks (block 543) whether it is correct. The GAGW returns (block 544) to the PAC a GAGW_PAC_AUTHANSWER_RESP message to inform the PAC whether the SIGN_SRES is correct. Alternatively, the GAGW may compute the correct SIGN_SRES and return it to the PAC so that the PAC itself verifies whether the MT generated SIGN_SRES is correct. In either case, the PAC verifies (block 519) the response from the GAGW and decides (block 520) next actions based on the response. If the response is positive, that is successful authentication, then the PAC proceeds to block 523 to start billing. Otherwise, the execution proceeds to block 521. There, a NACK is sent as a PAC_MT_AUTH_ANSWER_RESP_ERR to the MT to indicate an error in the authentication and the SESSION_ID is removed (block 522) from the record in which it was stored.

Next, the steps related to billing are explained. In block 523, a message PAC_GAGW_STARTBILLING_REQ is sent to the GAGW. The message informs the GAGW the possibility to apply charges to the account of the user of the MT to be added in a GSM invoice. The GAGW receives (block 547) this message and replies with a message GAGW_PAC_STARTBILLING_RESP as a confirmation. The message is verified (block 524) by the PAC, and in case of a denial instead of confirmation, the PAC returns to block 521. Otherwise, (block 526) an acknowledge message PAC_MT_AUTHSTART_RESP_OK is sent to the MT to confirm the start of possible billing and a timer is started.

In the next phase, the PAC remains idle and provides periodical billing updates. These updates are triggered by debited events, such as transmission or reception of data packets. The PAC may combine the charges and, only after a certain period of time or after reaching of a certain triggering amount of charge, perform a billing update corresponding to the lump sum thus gathered. When billing an event, the PAC sends a PAC_GAGW_UPDATEBILLING_REQ to notify the GAGW about the billing update. The GAGW receives (block 547) this message and responds (block 548) by a receipt message GAGW_PAC_UPDATEBILLING_RESP. The PAC receives (block 528) the receipt and checks (block 529) if it is positive. If the receipt is negative, the PAC prevents (block 532) MT for transferring data packets to and from the WISP, sends a billing stop to the GAGW, and sends (block 533) an authentication request to the MT for its re-authentication. On the other hand, if the receipt is positive in block 529, the PAC checks (block 530) the timer to detect a session timeout. If a timeout is detected, the PAC continues to block (block 532) and proceeds as described above. If no timeout is detected, the PAC operation returns to block 527.

FIGS. 12a to 12d form together a flow chart showing the functionality of the GSM/GPRS Authentication and billing Gateway (GAGW) during authentication in the system of FIG. 7. The flow chart shown in FIGS. 11a and 11b illustrated the functionality of the PAC and here the same procedure is considered from the GAGW's point of view. The procedure starts from block 601. The PAC sends to the GAGW the PAC_GAGW_AUTHSTART_REQ message containing the IMSI and the domain name of the MT (defined by the SIM_B). The GAGW checks (block 611) whether the MT is already authenticated. If yes, then an authentication validity timer (described later) is stopped (block 613) and existing user information is used (block 615). Otherwise, a temporary user ID is allocated to the MT identified by the IMSI and the subscriber's data (IMSI and corresponding user ID) is stored (block 619) in a record of a database.

Then, the MT authentication is started (block 621). The GAGW requests (block 623) the GSM triplets from the home GSM telecommunications network of the subscriber by a GAGW_MSC_DATA_REQ message sent to the closest MSC 681. The MSC responds (block 682) by an MSC_GAGW_DATA_RESP message containing one or more GSM triplets and additionally information concerning whether or not the MSC allows billing for the use of the PAC by that user. The GAGW verifies (block 627) the response. If the user is not authorised to the billing service, or alternatively, if the reply timer expires (block 625), the GAGW sends (block 629) an authorisation error message GAGW_PAC_AUTHSTART_RESP_ERROR to the PAC (block 602). Otherwise, the timer has not expired and the verification of the response is positive and the procedure continues from block 633. The GAGW retrieves from the database (block 635) the MT_RAND and at least one GSM triplet associated to the subscriber being authenticated. Then the GAGW calculates a SIGNrand using a hash function and the Kc and RAND of (each of) the GSM triplet(s) used. This certain number of Kcs is denoted by n*Kc. Here, the asterisk does not refer to a multiplication but to the number of different valued parameters Kc. The same applies to all the other occurrences of asterisk as well. For multiplication, a dot "." is used instead of an asterisk. As the MSC typically provides one to four different GSM triplets in response to one request, one or more triplets can be used for authentication. By using two or more triplets instead of just one, enhanced security is obtained because the keys are longer and the recurring period, in which the same key is used again, increases. This further allows increase of the validity term of the authentication keys formed.

In block 637, the GAGW sends a challenge and it's the SIGNrand in a GAGW_PAC_AUTHSTART_RESP message to the PAC (block 603). The PAC responds with a PAC_GAGW_AUTHANSWER_REQ message to indicate if the user is willing to accept the billing. The GAGW checks (block 641) the message and if it shows that the user does not accept billing, the GAGW stores (block 643) the response for statistical purposes (block 639) and sends a GAGW_PAC_AUTHANSWER_RESP message to the PAC to acknowledge to the PAC that the authentication is to be aborted. The statistical purposes include gathering information on that how many of the users have accepted and how many have not accepted the billing. This information can be used for optimising the price for the connection in order to maximise the profits of the WISP operators and GSM telecommunications network operators.

If the message PAC_GAGW_AUTHANSWER_REQ indicates that the user is willing to accept the billing, the GAGW tests (block 645) the SIGNsres. This testing is carried out by computing the SIGNres using the hash function known by the MT and using the same input data (MT_RAND, Kc and RAND of each of the GSM triplets used). For the testing, the GAGW retrieves (block 647) input data from the database. As a next step (block 649), the GAGW tests whether the SIGNsres was indeed correct.

If the SIGNsres was incorrect, the GAGW sends (block 653) a reject message GAGW_PAC_AUTHANSWER_RESP_ERR to the PAC (block 606).

If the SIGNsres was correct, the GAGW grants the MT access and generates (block 651) the Kpac_MT. Then, the GAGW sends (block 655) access accept by a message GAGW_PAC_AUTHANSWER_RESP_OK to the PAC (block 607). Furthermore, the GAGW generates (block 657) a PAC-specific authentication ticket and stores (block 663) it. Then the GAGW updates (block 659) the user information in the database and stores (block 665) the user data comprising the Kpac_MT. Finally, the GAGW starts (block 661) the authentication validity timer (mentioned also in relation to block 613) and starts an (block 667) accounting process. The authentication validity timer is preferably implemented by storing to the database the lapsing time of the authentication. This enables use of the common hardware (clock) for a plurality of different users and easy checking of expiry of the authentication by comparison of the present to the lapsing time.

Access to the WISP by the MT is charged to the user's GSM account. When the MT is authenticated to the WISP, the PAC starts collecting billing information. The PAC maintains a database of the connection time and amount of data sent. When the MT disconnects, the PAC relays this information to GAGW. The GAGW then generates a GSM Call Detailed Record (CDR) ticket and relays it to the GSM billing system known from the GSM.

Figure 13:
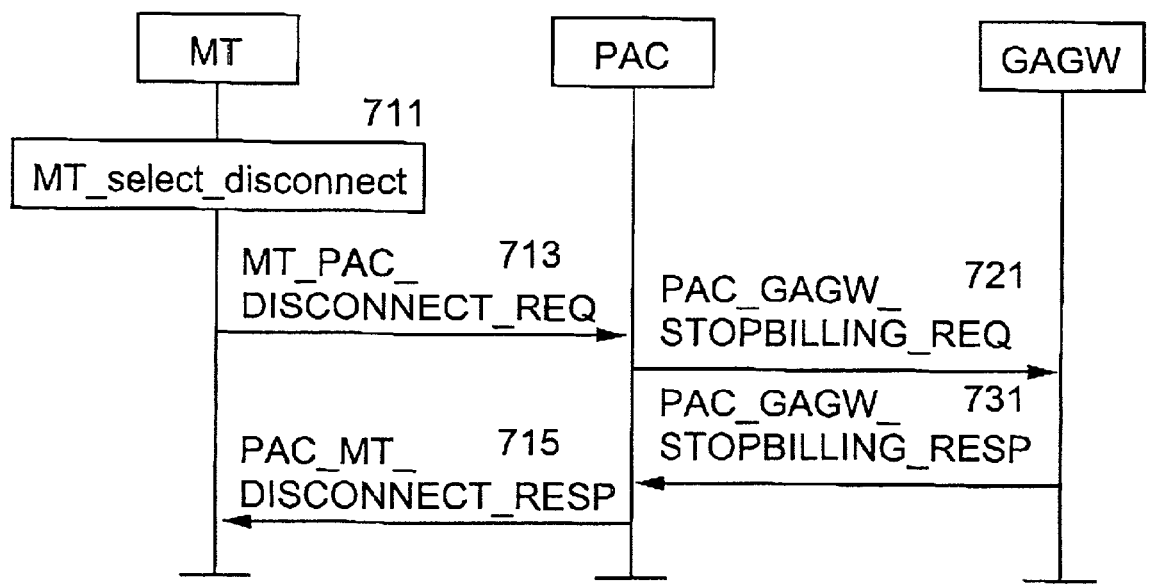
FIG. 13 shows the major signalling of a controlled disconnection of the mobile node from the network of the system of FIG. 7.

FIG. 13 shows the major signalling steps of a controlled disconnection of the MT from the network. The disconnecting process starts from that that the MT selects (block 711) that it be disconnected. The MT sends (block 713) an MT_PAC_DISCONNECT_REQ message to the PAC. The PAC sends (block 721) a PAC_GAGW_STOPBILLING_REQ message requesting the GAGW to stop billing. The GAGW responds by sending (block 731) a PAC_GAGW_STOPBILLING_RESP to the PAC. Finally, the PAC sends a PAC_MT_DISCONNECT_RESP message to acknowledge the MT of a successful disconnection.

In example 2, the functionality for the authenticator entity which is responsible for authenticating a terminal is located in a network layer router. Alternatively, the functionality is in a link layer element, such as a WLAN access point, in which case the interface between the MT and the WLAN access point is based on a link layer protocol rather than IP.

EXAMPLE 3

The functional architecture of the present invention can be implemented using several suitable protocols. However, in this example an enhanced version of, an Internet Key Exchange (IKE, RFC 2409) protocol is used in communications between the MT and the PAC. Remote Authentication Dial In User Service (RADIUS, RFC 2138, RFC 2139) protocol is used for communications between the PAC and the GAGW. It should also be noted the PAC functionality could be integrated inside an access point server if needed. However, by separating the PAC functionality from the access point, handovers are easier to implement and hence the separation is appropriate for installations comprising a plurality of access points. FIG. 14 shows the main signalling between the MT, the PAC and the GAGW when the enhanced IKE protocol referred to as IKE+ is used between the MT and the PAC.

HDR is an Internet Security Association and Key Management Protocol (ISAKMP, RFC 2409) header whose exchange type defines the payload orderings. When written as HDR* it indicates payload encryption. SA is an SA negotiation payload with one or more Proposal and Transform payloads. KE is the Key Exchange payload. IDmt is the identity payload for the MT.

The IKE+ protocol will now be described in detail.

The IKE+ protocol uses IKE mechanisms with enhancements. This authentication mode is an extension to ones defined in RFC2409 and is related to the one suggested by Litvin M., Shamir R., Zegman T., in "A Hybrid Authentication Mode for IKE", draft-ietf-ipsec-isakmp-hybrid-auth-03.txt, December 1999. The protocol is designed for two-way authentication between a the MT and the PAC, and uses GSM authentication in phase 1. The exchange is not symmetric, unlike the ones in the RFC2409. Instead, both IKE negotiators must know where they execute because they communicate with different components: The MT uses its attached SIM_B for the authentication related functions, whereas the PAC relies on an authentication server (GAGW) in the GSM telecommunications network, in a chain:

SIM_B < - - - >MT < - - - >PAC < - - ->GAGW

IKE negotiation between the MT and the PAC uses the standard ISAKMP payload syntax. Other messages do not have the same syntax, and are implementation dependent.

As this exchange is rather more complicated than the ones defined in the RFC2409, it is only defined in IKE main mode. The following parameters are used in the exchange. They are contained in standard ISAKMP payloads, as explained later.

| | |
|---|---|
| IMSI | IMSI read from the SIM card |
| MT_RAND | a random number generated by the MT |
| RAND | a random number given by the GAGW |
| SIGNrand | calculated by the GAGW as HMAC(Kc * n, RAND * n\|MT_RAND\|billinginfo), where HMAC is the MD5 algorithm of RFC1321 applied in HMAC mode described in RFC2104 and Kc is the encryption key from the SIM card |
| SIGNsres | calculated by the MT and the GAGW as HMAC (Kc * n, SRES * n\|IMSI\|MT_RAND), where SRES is the authenticator from the SIM card |
| Kpac_MT | calculated by the GAGW and the MT as HMAC(Kc * n, RAND * n\|IMSI\|MT_RAND) |

Here, the bar "|" refers to a string concatenation, wherein two sets of digits are concatenated together, for example 1234|567=1234567.

The exchange, as shown below, is vulnerable to a man-in-the-middle attack between the MT and the PAC, because of the authentication asymmetry. However, if the exchange is used over a medium such as a wireless LAN, this kind of an active attack is difficult. The fact that the GAGW only talks to PACs it knows over secure channels further reduces the likelihood of success of such an attack.

The security of the exchange can be enhanced with a public key technique, which does not remove the threat of a man-in-the-middle attack, but protects the user's IMSI: The MT may request the GAGW's certificate from the PAC, and use the public key in it to encrypt the IMSI value sent over in the IDmt payload. The IMSI value is then known only to the MT and the GAGW, and can be also used to authenticate the PAC to the MT, as explained later.

When the ID payload is used to carry the MT's IMSI, the ID Type field in the ISAKMP generic payload header is set to ID_USER_FQDN.

The following values identify the roles the IKE peers should assume. Values are taken from the private use range defined in the RFC2409 for the Authentication Method attribute and should be used among mutually consenting parties.

| Type | Value | Explanation |
|---|---|---|
| GSMAuthInitMT | 65100 | IKE negotiation initiated by the MT |
| GSMAuthInitPAC | 65101 | IKE negotiation initiated by the PAC |

FIG. 14 shows how the exchange works when the MT is the initiator of the IKE negotiation.

The most notable exception to normal IKE practices, where only the first two messages affect the negotiated IKE SA, the final SA lifetime will be set to the sessiontimeout value selected by the GAGW. The initial lifetime is assumed to be long enough to allow the negotiation to finish and the final value to be set.

The access key Kpac_MT between the MT and the PAC is generated as SKEYID=prf(g^xy, CKY-I|CKY-R). The values for SKEYID_{a,d,e} are computed in the usual fashion based on SKEYID.

If the GAGW is able to recognise the IMSI, it calculates SIGNrand. For sending RAND and SIGNrand over to the MT, the PAC uses MT_RAND) and hash payloads (HASH (1)), respectively. If there is a need to send more than one RAND in a single message, they can be concatenated in the same MT_RAND payload, or many MT_RANDs can be sent. The receiver can easily determine the sender's choice, because the size of the GSM RAND does not change frequently. If the IMSI verification fails, the PAC indicates it to the MT by using a notify payload with notification type set to INVALID-ID-INFORMATION. Other, implementation dependent, error codes may be additionally transmitted in the notify payload.

The GAGW also delivers billing information, which the PAC forwards to the MT in a notification payload (NOTIFY). The status code for the notify payload is BILLING_INFO, and uses value 32768 from the private range. The person using the MT must be queried whether she will accept the tariff offered. If she does, or if a predefined timer expires, the exchange is continued with message seven. Otherwise the MT sends a notify message to the PAC with notification type ATTRIBUTES-NOT-SUPPORTED. The MT should use a relatively short lived timer so that the protocol machine in the PAC will not be delayed excessively.

The MT calculates SIGNsres, and sends it over in HASH (2) to the PAC, which forwards it to the GAGW for verification. If the verification succeeds, the GAGW's response message contains an access key (Kpac_MT) between the MT and the PAC for later use, and a timeout value for the MT's session with the GAGW. The timeout value chosen by the GAGW updates the one agreed upon previously in the IKE negotiation. The PAC must, therefore, send an updated IKE SA to the MT. The PAC does not send the Kpac_MT value to the MT, but instead uses it to encrypt the body of the updated SA payload. This is shown as <SA_b>Kpac_MT. The SIGNresult value from the GAGW is packaged in HASH(3) for IKE transport. If the GAGW cannot verify the MT's identity, the PAC indicates it to the MT by using a notify payload with the notification type set to AUTHENTICATION-FAILED.

FIG. 15 shows the minor modifications to the procedure of FIG. 14 when the PAC is the initiator. One extra message is required for the certificate passing to work. The PAC could include the GAGW's certificate in the first message, but this way the MT can decide whether it needs the certificate. The GAGW, and unchanged parts are omitted from FIG. 15.

Figure 16:
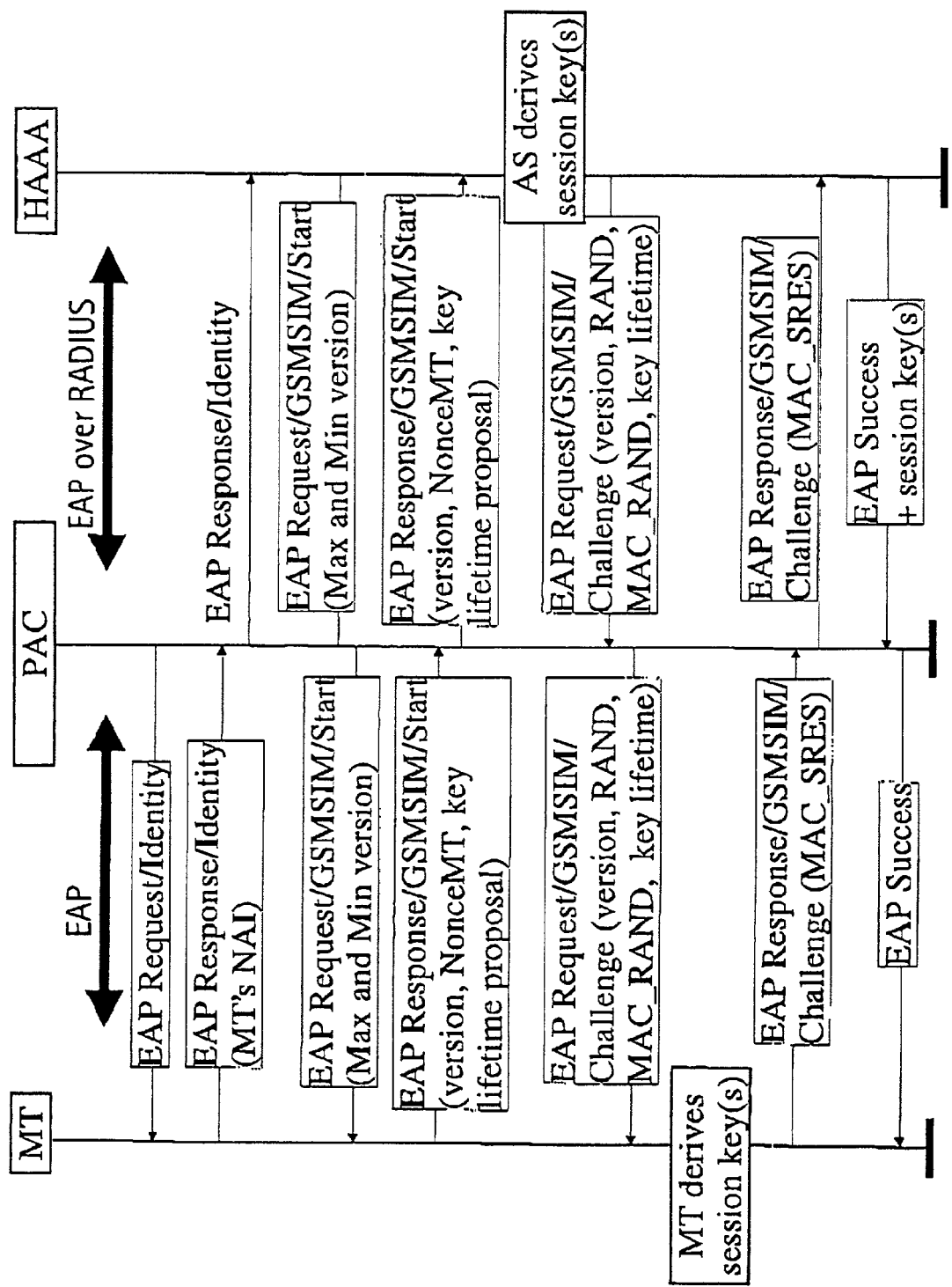
FIG. 16 illustrates procedure in an authentication system according to an embodiment of the invention.

FIG. 16 illustrates procedure in an authentication system according to an embodiment of the invention. The authentication uses the Extensible Authentication Protocol (EAP) known from the RFC 2284, "PPP Extensible Authentication Protocol (EAP)", by L. Blunk and J. Vollbrecht, March 1998. The embodiment of FIG. 16 can also be combined with any of the embodiments described above.

EAP is originally a Point-to-Point Protocol (PPP) authentication framework which enables a PPP client authenticate with its AAA server without the access point needing to know the details of the authentication method.

In this embodiment, the PAC forwards EAP packets between the MT and the GAGW, until it gets a success or a failure indication from the GAGW.

By using EAP, the details of the authentication method need to be known by the MT and the HAAA, but not by any intermediate authenticator such as the PAC. Thus, the EAP protocol is in fact a client-AAA server protocol where the authenticator is a relay that forwards the EAP packets without caring what they contain. The PAC is only interested in the outcome of the authentication (success or failure). In addition, a session key is generated as part of the authentication process, and this key may be distributed to the PAC.

FIG. 16 shows the EAP packets that are transmitted in a successful SIM authentication. The EAP authentication typically begins with the PAC issuing the MT an EAP Request with the type 1 (Identity). The MT replies with the EAP Response/Identity, containing the MT's identity. In roaming environment, the identity is the Network Access Identifier (NAI).

Following the MT's EAP Response/identity packet, the terminal receives EAP requests of the type GSMSIM from the HAAA and sends the corresponding EAP Responses. The EAP packets of type GSMSIM also have a Subtype field. The first GSMSIM type EAP Request is of the Subtype Start. This packet contains the smallest and greatest GSM SIM protocol version number supported by the HAAA. The MT's response (EAP Response/GSMSIM/Start) contains the MT's version number (which must be between the minimum and maximum versions of the EAP Request), the MT's key lifetime proposal, and a random number MT_RAND, formed by the MT. All subsequent EAP Request and Response packets contain the same version as the MT's EAP Response/GSMSIM/Start packet. After receiving the EAP Response/GSMSIM/Start, the Authentication server obtains n GSM triplets from the GSM network and generates the shared session key K.

The next EAP Request the Authentication Server sends is of the type GSMSIM and subtype Challenge. It contains the RAND challenges, the key lifetime decided by the HAAA, and an authenticator for the challenge and the lifetime. On receipt of this message, the MT runs the GSM authentication algorithm on the SIM card and calculates a copy of the MAC_RAND authenticator. The MT then verifies that the MAC_RAND it has calculated equals the MAC_RAND received. If the MAC_RANDs do not match, then the MT cancels the SIM authentication.

If all checks out, the MT responds with the EAP Response/GSMSIM/Challenge, containing the MT's response MAC_SRES. The HAAA verifies that the MAC_SRES is correct and sends the EAP Success packet, indicating that the authentication was successful. The HAAA includes the derived session keys in the message it sends to the PAC.

The EAP packets can be carried between the MT and the PAC by a PPP protocol if the PAC is a dial-up server. Other protocols may also be used. For example, if the PAC is an Authenticator Port Access Entity (PAE) on a Local Area Network (LAN), then the EAP encapsulation over LAN protocol (EAPOL) proposed by the IEEE Draft P802.1X/D9, Nov. 29, 2000, can be used as well.

Particular implementations and embodiments of the invention have been described. It is clear to a person ordinarily skilled in the art that the invention is not restricted to details of the embodiments presented above, but that it can be implemented in other embodiments using equivalent means without deviating from the characteristics of the invention. For example, in an embodiment, the MT is physically a unit separate from a mobile station that has the SIM_B. Then, the MT forms a permanent link or a temporary link to the mobile station, for example low power radio frequency link such as Bluetooth link. In this case, it is not even necessary that the telecommunications network uses any separable SIMs for authenticating. The SIM functionality may be integrated to the mobile station in an inseparable manner, for example the $K_i$ or its equivalent can be stored in a non-volatile memory of the mobile station. Naturally, the mobile node can be integrated with the mobile station so that the authenticating functionality of the mobile station is accessible by a terminal part regardless whether the mobile station is designed to use a SIM or not. In yet another embodiment, the packet data network is a fixed packet data network, for example a LAN or a Wide Area Network. In a further embodiment, the invented authentication is used for authenticating a mobile node to a service, for example to a WWW portal or an Internet banking service. Hence, The scope of the invention is only restricted by the attached patent claims.

| Abbreviations | |
|---|---|
| AAA | Authentication, Authorisation and Accounting |
| FA | Foreign Agent |
| FAAA | Foregin Authentication, Authorisation and Accounting server |
| GAGW | GSM Authentication Gateway |
| GSM | Global System for Mobile communications |
| GSM triplet | RAND, Kc, and SRES |
| HA | Home Agent |
| HAAA | Home Authentication, Authorisation and Accounting server |
| HDR | Internet Security Association and Key Management Protocol (ISAKMP) header whose exchange type defines the payload orderings |
| HLR | Home Location Register (a GSM telecommunications network element) |
| IMSI | International Mobile Subscriber Identity, used in GSM |
| IPsec | Internet Protocol Security protocol |
| ISAKMP | Internet Security Association and Key Management Protocol |
| Kc | A 64 bit long key produced by a SIM |
| $K_i$ | Subscriber authentication key, used in GSM and stored on the GSM telecommunications network (for example HLR) and on the SIM |
| MD5 | Message Digest 5 |
| MT | Mobile Node (Mobile IP client) |
| MSC | Mobile Switching Center (a GSM telecommunications network element) |
| MT | Mobile node |
| NAI | Network Access Identifier, for example user@nokia.com or imsi@gsm.org |

-continued

| Abbreviations | |
|---|---|
| RAND | A 128 bit random number used as a challenge in GSM authentication |
| MT_RAND | A random key for protecting against replay attacks, MT generated |
| SIM | Subscriber Identity Module |
| SPI | Security Parameter Index |
| SRES | Signed Response, a 32 bit response in GSM authentication |

The invention claimed is:

1. Authentication method for authenticating a mobile node to a packet data network, comprising the steps of:
   providing the mobile node with a mobile node identity and a shared secret specific to the mobile node identity and usable by a telecommunications network;
   providing the mobile node with a protection code;
   sending the mobile node identity and the protection code from the mobile node to the packet data network;
   providing the packet data network with authentication information usable by the telecommunications network, the authentication information comprising a challenge based on RAND codes of at least two authentication triplets of the telecommunications network, and a session secret corresponding to the mobile node identity and derivable using the challenge and the shared secret;
   forming cryptographic information using at least the protection code and the session secret;
   sending the challenge and the cryptographic information from the packet data network to the mobile node;
   checking at the mobile node the validity of the cryptographic information using the challenge and the shared secret;
   generating at the mobile node the session secret and a first response corresponding to the challenge, based on the shared secret;
   sending the first response to the packet data network; and
   checking the first response for authenticating the mobile node.

2. Method according to claim 1 further comprising the steps of:
   providing the mobile node with a subscriber identity for the telecommunications network; and
   forming from the subscriber identity a Network Access Identifier as the mobile node identity by the mobile node.

3. Method according to claim 1 further comprising the step of recognising the telecommunications network at the packet data network directly from the mobile node identity.

4. Method according to claim 1, further comprising the step of providing the packet data network with a shared session key based on the session secret.

5. Method according to claim 1, further comprising the step of providing a communications link between the packet data network and the mobile node for communicating the challenge between them, the communications link not being a link of the telecommunications network.

6. Method according to claim 1, further comprising the step of using a Subscriber Identity Module for the providing the mobile node with a mobile node identity and the generating of the session secret based on a shared secret specific for the mobile node identity.

7. Method according to claim 6, wherein the step of providing the mobile node with the mobile node identity and the shared secret specific for the mobile node identity further comprises the sub-steps of:
   forming a local connection between the mobile node and a subscriber identity module; and
   receiving from the subscriber identity module to the mobile node the mobile node identity and a session secret specific to the mobile node identity.

8. Method according to claim 1, further comprising the steps of:
   obtaining a second response by the telecommunications network; and
   using the second response in the checking the first response.

9. Method according to claim 1, further comprising the step of sending the challenge from the telecommunications network to the mobile node via the packet data network.

10. Method according to claim 1, wherein the protection code is based on time.

11. Method according to claim 1, further comprising the step of generating a shared session key for Internet Key Exchange, wherein the shared session key is based on the session secret and the challenge.

12. A network entity for acting as an interface between a packet data network and a telecommunications network having an access to an authentication server, the network entity comprising:
   an input for receiving a mobile node identity and a protection code from the packet data network;
   an output for providing the authentication server with the mobile node identity;
   an Input for receiving a challenge and a session secret corresponding to the mobile node identity from the authentication server;
   a first processor for forming cryptographic information using at least the protection code and the session secret;
   an output for providing the packet data network with the challenge and the cryptographic information for further transmission to a mobile node;
   an input for receiving a first response corresponding to the challenge, based on a shared secret spedflc to the subscriber identity and known by the mobile node and the telecommunications network, from the mobile node via the packet data network; and
   a second processor for verifying the first response for authenticating the mobile node, and
   wherein the network entity is configured to receive at least two challenges corresponding to the mobile node identity from the authentication server, to form the cryptographic information based on the at least two received challenges and to output the at least two received challenges and the cryptographic information for further transmission to the mobile node.

13. A network entity according to claim 12 further comprising:
   an output for providing the mobile node with a subscriber identity (IMSI) for the telecommunications network; and
   a processor for forming from the subscriber identity a Network Access Identifier (NAI) as the mobile node identity by the mobile node.

14. A network entity according to claim 12 further configured to generate a shared session key for Internet Key Exchange, wherein the shared session key is based on at least one session secret and at least one challenge.

15. The network entity of claim 12 wherein the network entity comprises a gateway.

* * * * *